US009210179B2

(12) United States Patent
Mevec et al.

(10) Patent No.: US 9,210,179 B2
(45) Date of Patent: *Dec. 8, 2015

(54) SYSTEMS, METHODS, AND COMPUTER MEDIUM TO SECURELY TRANSFER BUSINESS TRANSACTIONAL DATA BETWEEN NETWORKS HAVING DIFFERENT LEVELS OF NETWORK PROTECTION USING BARCODE TECHNOLOGY WITH DATA DIODE NETWORK SECURITY APPLIANCE

(71) Applicant: Saudi Arabian Oil Company, Dhahran (SA)

(72) Inventors: Paul Francis Mevec, Dhahran (SA); Ibrahim A. Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 1 day.

This patent is subject to a terminal disclaimer.

(21) Appl. No.: 14/336,154

(22) Filed: Jul. 21, 2014

(65) Prior Publication Data
US 2015/0264056 A1    Sep. 17, 2015

Related U.S. Application Data

(60) Provisional application No. 61/954,237, filed on Mar. 17, 2014.

(51) Int. Cl.
*G06F 12/14*      (2006.01)
*H04L 29/06*     (2006.01)
*G06F 17/30*     (2006.01)

(52) U.S. Cl.
CPC .............. *H04L 63/123* (2013.01); *H04L 63/04* (2013.01); *H04L 63/20* (2013.01)

(58) Field of Classification Search
CPC ................. G06F 3/021; G06F 17/3075; G06F 17/30575; H04L 12/2461; H04L 41/28
See application file for complete search history.

(56) References Cited

U.S. PATENT DOCUMENTS 7,328,848 B2   2/2008  Xia et al.
7,478,755 B2   1/2009  Sekiguchi
(Continued)

FOREIGN PATENT DOCUMENTS

WO   2008093314   8/2008
WO   2009047556   4/2009
WO   2013101358   7/2013

OTHER PUBLICATIONS

"DataDiode" Fox-IT, retrieved at https://www.fox-it.com/en/products/datadiode, Jan. 10, 2014, 3 pages.
(Continued)

*Primary Examiner* — Venkat Perungavoor
(74) *Attorney, Agent, or Firm* — Bracewell & Giuliani LLP; Constance Gall Rhebergen; Brian H. Tompkins

(57) ABSTRACT

Embodiments of computer-implemented methods, systems, and non-transitory computer-readable medium having one or more computer programs stored therein are provided to transfer contents of transactional data between two or more networks configured to have different levels of network protection using barcode technology with a data diode network security appliance. Generated data barcodes can be decoded to produce contents of transactional data to be transmitted between two or more networks configured to have different levels of network security protection, and decoded contents of the transactional data can then be securely communicated back to the sender for comparison by use of a data diode unit. Generated verification barcodes can then be decoded to produce verification data. Verification data can confirm success of the transmission of contents of the transactional data encoded in the data barcodes. Decoded contents of the transactional data can then be stored responsive to an indication of successful transmission.

24 Claims, 21 Drawing Sheets

(56) References Cited

U.S. PATENT DOCUMENTS

| | | |
|---|---|---|
| 2002/0112181 A1 | 8/2002 | Smith |
| 2007/0182983 A1 | 8/2007 | Wyatt et al. |
| 2011/0210171 A1 | 9/2011 | Brown |
| 2013/0019096 A1 | 1/2013 | Palzer et al. |
| 2013/0086465 A1 | 4/2013 | Boudville |
| 2013/0137510 A1 | 5/2013 | Weber |
| 2013/0152206 A1 | 6/2013 | Staubly |

OTHER PUBLICATIONS

"DualDiode Technology & Owl System Functionality" Owl Computing Technologies, Inc., retrieved at http://www.owlcti.com/dualdiode_technology.html, 1999, 1 page.

"QR Code Essentials" Denso, 2011, pp. 1-12.

Jones et al. "Secure Data Export and Auditing using Data Diodes" University of Iowa, Department of Computer Science, Iowa City, Iowa, 5 pages.

Poulin, Chris "Data Diodes: Super Security or Super Pain?" retrieved at http://www.securityweek.com/data-diodes-super-security-or-super-pain, Jan. 10, 2012, 8 pages.

Scarbrough et al. "Tennessee Valley Authority's (TVA) Data Diode Program" ICSJWG Spring Conference, May 8-9, 2012, 20 pages.

Sheble, Nicholas "Data Diode Devices Secure Systems" retrieved at http://www.isssource.com/data-diode-devices-secure-systems, Jan. 25, 2012, 5 pages.

International Search Report and Written Opinion for PCT/US2015/020906 dated Jun. 12, 2015.

ated on Mar. 17, 2014. This application further
SYSTEMS, METHODS, AND COMPUTER MEDIUM TO SECURELY TRANSFER BUSINESS TRANSACTIONAL DATA BETWEEN NETWORKS HAVING DIFFERENT LEVELS OF NETWORK PROTECTION USING BARCODE TECHNOLOGY WITH DATA DIODE NETWORK SECURITY APPLIANCE

RELATED APPLICATIONS

This application relates to, claims priority to and the benefit of, and incorporates by reference herein U.S. Provisional Patent Application No. 61/954,237, titled "Systems, Methods, and Computer Medium to Securely Transfer Data Between Networks Having Different Levels of Network Protection" and filed on Mar. 17, 2014. This application further relates to, claims priority to and the benefit of, and incorporates by reference herein U.S. Non-Provisional patent application Ser. No. 14/336,395, titled "Systems, Methods, and Computer Medium to Securely Transfer Business Transactional Data Between Physically Isolated Networks Having Different Levels of Network Protection Utilizing Barcode Technology" and filed the same day, Jul. 21, 2014, and concurrently herewith; U.S. Non-Provisional patent application Ser. No. 14/336,423, titled "Systems, Methods, and Computer Medium to Securely Transfer Large Volumes of Data Between Physically Isolated Networks Having Different Levels of Network Protection" and filed the same day, Jul. 21, 2014, and concurrently herewith; and U.S. Non-Provisional patent application Ser. No. 14/336,442, titled "Systems, Methods, and Computer Medium to Securely Transfer Backup Data Between Physically Isolated Networks Having Different Levels of Network Protection" and filed the same day, Jul. 21, 2014, and concurrently herewith.

BACKGROUND OF THE INVENTION

1. Field of the Invention

Embodiments of the invention relate to computer and data networks and, more particularly, to systems, methods, and non-transitory computer-readable medium having one or more computer programs stored therein to transfer data between networks.

2. Description of the Related Art

Organizations and entities that have multiple networks sometimes protect those networks from unauthorized access by establishing different, higher security or protection levels for one or more networks. For example, an entity may choose to establish stronger protections for one network—such as a process automation system network—that the entity prioritizes as more important, or even essential, to its operations than for another network—such as a corporate business network, for instance. Many industries, entities, and government agencies use one or more networks that require a higher level of security but nevertheless must be able to communicate with other, lower security networks. These high-security networks, therefore, may be physically isolated from other networks. In some circumstances, a high-security network must be totally isolated from other networks. That is, the high-security network must have no path of communication with other networks.

In the process automation industry, for example, network security may be essential to an entity's ability to maintain production at production facilities. It also may be important to the health and security of employees at production facilities, as well as part of environmental protection strategies. It has grown more difficult over time, however, to ensure the integrity of process automation systems. One reason behind the increasing difficulty is that newer process automation systems incorporate open system designs, which are more difficult to protect than legacy process automation systems. Newer process automation systems' combined use of open networking equipment, which transfers data using TCP/IP communication protocols, and widely-used operating systems, such as Microsoft Windows, has meant that corporate business networks and process automation system networks may be seamlessly integrated. That is, ease of communication between corporate business networks and process automation system networks has increased. Although the increased ease of communication may have some advantages, it has also exposed critical process automation system networks to new vulnerabilities.

Process automation and control engineers are constantly working to secure process automation systems from unauthorized intrusion and virus infection. Some of the approaches they use may include anti-virus patch management, Microsoft Windows patch management, network designs (such as demilitarized zones) that eliminate direct communication between a low-security network and a high-security network, Microsoft Windows operating system hardening, constant firewall and network screening (e.g., 24/7/365), process automation system user accounts and password management, and access control lists for network equipment. Technicians and engineers, for example, may follow a depth in defense strategy, such as the standards outlined in ISA-99, "Industrial Automation and Control Systems Security," or in the United States Department of Homeland Security's "Chemical Facilities Anti-Terrorism Standards," or in standards developed by the Nuclear Regulatory Commission as a protocol or regimen to defend against the unauthorized intrusions. Even when these protective measures are used, however, process automation systems are still vulnerable because data can be transferred from a low-security network, such as a corporate business network, to the process automation system network when data is "written" to the process automation system network for business continuity purposes.

To prevent an intruder or virus from reaching a process automation system network or compromising a process automation system, organizations and other entities have taken several protective measures to prevent a low-security network from "writing" data to the process automation system network through traditional networking practices. For example, entities sometimes use demilitarized zones (DMZs), as illustrated in FIG. 7. As depicted, a company wide area network 202 is in communication with the Internet 201 and a corporate business server 203, as will be understood by those skilled in the art. Together, the company wide area network 202 and corporate business server 203 may form a corporate network for an entity. A separate process automation system network includes two process automation system servers 221 and 222, which are in communication with one another through a network switch 208. As illustrated in FIG. 7, a DMZ may protect the process automation system network. That is, although data transfer is bidirectional between a facility business server 220 and the process automation system servers 221 and 222, transferred data passes through the network switch 208, a firewall 207, a DMZ router 205, and a DMZ switch 206. Data transfer is also bidirectional between the facility business server 220 and the corporate business server 203, but transferred data passes through a different firewall 204, a DMZ router 205, and a DMZ switch 206.

SUMMARY OF THE INVENTION

Applicants have recognized that although the use of a DMZ, for example, can reduce risks of intrusion or compromise of a high-security network, such as a process automation system network, the use of a DMZ does not eliminate or adequately reduce some types of risks. Consequently, embodiments of systems, methods, and non-transitory computer-readable medium having one or more computer programs stored therein that address these problems and sources of problems are provided herein. Embodiments of the invention, for example, can include systems, methods, and non-transitory computer-readable medium having one or more computer programs stored therein to transfer data between two or more networks configured to have different levels of network protection.

A computer-implemented method to transfer data between two or more networks configured to have different levels of network protection, according to an embodiment of the invention, for example, can include decoding one or more barcodes indicative of contents of transactional data to thereby define one or more data barcodes. The transactional data can be associated with and positioned within a first network, for example. Decoding the one or more data barcodes can be responsive to receipt of a scan of a display of a first computer in communication with and positioned within the first network. Further, decoding the one or more data barcodes can be by use of one or more barcode scanning devices in communication with a second computer. The second computer can be positioned remote from the first computer and in communication with and positioned within a second network. The second network can be configured to have a different level of network security protection than the first network. Further, the second network can be configured to allow only one-way secure communication from the second network to the first network by use of a data diode unit. Decoding the one or more data barcodes can thus produce contents of the transactional data represented by the one or more data barcodes. A method can then include transmitting decoded contents of the transactional data from the second network to the first network through the data diode unit. Transmitting decoded contents of the transactional data can thereby securely communicate decoded contents of the transactional data in one-way communication from temporary storage associated with the second network to the first network for comparison to contents of the transactional data positioned within the first network.

A method can further include decoding one or more different barcodes indicative of contents of one or more verification files to thereby define one or more verification barcodes. The one or more verification files can be configured to indicate success of transmission of contents of the transactional data from the first network to the second network. As a result, decoding the one or more verification barcodes can produce contents of the one or more verification files represented by the one or more verification barcodes to thereby confirm success of the transmission of contents of the transactional data from the first network to the second network. Further, decoding the one or more verification barcodes can be responsive to receipt of a scan of the display of the first computer by use of the one or more barcode scanning devices. A method can then include storing decoded contents of the transactional data in more permanent storage associated with the second network, responsive to an indication from decoded contents of the one or more verification files of successful transmission of contents of the transactional data from the first network to the second network.

In some instances, method can also include, for example, displaying one or more representations of contents of the transactional data on the display of the first computer when the one or more data barcodes are generated on the display of the first computer. A method can further include, after decoding the one or more data barcodes, transferring decoded contents of the transactional data to the temporary storage associated with the second network to thereby store decoded contents of the transactional data in one or more validation files. Contents of the one or more validation files can be configured to include decoded contents of the transactional data, for example. Additionally, a method can include displaying one or more representations of contents of the one or more validation files on the display of the second computer after decoding the one or more data barcodes and displaying one or more representations of contents of the one or more verification files on the display of the first computer when the one or more verification barcodes are generated on the display of the first computer. In some circumstances, each of the one or more representations of contents of the respective transactional data, one or more validation files, and one or more verification files can be configured to include one or more of text and numbers.

In addition, the data diode unit can include a first card configured to receive data to thereby define a receive card. The data diode unit can also include a second card configured to transmit data to thereby define a send card. While the receive card can be configured to be in communication with the first computer, the send card can be configured to be in communication with the second computer. In addition, transmitting decoded contents of the transactional data from the second network to the first network through the data diode unit can include transmitting decoded contents of the transactional data from the send card to the receive card through an optical link.

Further, a method can include generating the one or more data barcodes on the display of the first computer. A method can also include generating the one or more verification barcodes on the display of the first computer, responsive to a comparison of (1) the securely communicated decoded contents of the transactional data and (2) contents of the transactional data positioned in the first network. A method can still further include discarding decoded contents of the transactional data in the temporary storage associated with the second network, responsive to an indication from decoded contents of the one or more verification files of unsuccessful transmission of contents of the transactional data to the second network.

In some circumstances, the first network can include a high-security network, and the second network can include a low-security network. Conversely, in other circumstances, the first network can include a low-security network, and the second network can include a high-security network. Further, the one or more data barcodes can be configured to encode contents of the transactional data, and the one or more verification barcodes similarly can be configured to encode contents of the one or more verification files.

Barcodes and a barcode scanning device can include additional distinctive features. For example, in some cases, the one or more data barcodes and the one or more verification barcodes can include one or more of the following: two-dimensional matrix codes, QR Codes, Aztec Codes, and PDF417 codes. Additionally, a barcode scanning device can include one or more of the following: a barcode reading device, a QR Code reading device, a field-of-view barcode reading device, and a camera. Further, decoding the one or more data barcodes can include disregarding error-correction capabilities of the one or more data barcodes.

An embodiment can also include a system to transfer data between two or more networks configured to have different levels of network protection. For example, a system according to an embodiment can include a first computer in communication with and positioned within a first network. The first computer can include one or more processors and one or more displays in communication with the one or more processors. A system can further include a data diode unit in communication with one or more processors of a second computer and positioned to transmit data from the second computer to the first network, for example. Still further, a system can include the second computer. The second computer can be positioned remote from the first computer and in communication with and positioned within a second network. The second network can be configured to have temporary storage and separate more permanent storage associated therewith. Additionally, the second network can be further configured to have a different level of network security protection than the first network and to allow only one-way secure communication from the second network to the first network through the data diode unit. Furthermore, the second computer can include one or more processors and one or more input and output units in communication with the one or more processors of the second computer. The second computer can also include one or more barcode scanning devices in communication with the one or more processors of the second computer. In addition, the second computer can include non-transitory memory medium in communication with the one or more processors of the second computer. The memory medium can include computer-readable instructions stored therein that when executed cause the second computer to perform a series of steps.

The steps performed by the second computer can include, for example, decoding one or more barcodes indicative of contents of transactional data to thereby define one or more data barcodes. The transactional data can be associated with and positioned within the first network, for example. Decoding the one or more data barcodes can be responsive to receipt of a scan of one or more of the one or more displays of the first computer by use of the one or more barcode scanning devices. Further, decoding the one or more data barcodes can produce contents of the transactional data represented by the one or more data barcodes. The steps performed by the second computer can then include transmitting decoded contents of the transactional data from the second network to the first network through the data diode unit. Transmitting decoded contents of the transactional data from the second network to the first network can thereby securely communicate decoded contents of the transactional data in one-way communication from the temporary storage associated with the second network to the first network for comparison to contents of the transactional data positioned within the first network. The steps performed by the second computer can further include decoding one or more different barcodes indicative of contents of one or more verification files to thereby define one or more verification barcodes. As a result, decoding the one or more verification barcodes can produce contents of the one or more verification files represented by the one or more verification barcodes. Further, the one or more verification files can be configured to indicate success of transmission of contents of the transactional data from the first network to the second network. Consequently, decoding the one or more verification barcodes can thereby confirm success of the transmission of contents of the transactional data from the first network to the second network. Decoding the one or more verification barcodes can be responsive to receipt of a scan of one or more of the one or more displays of the first computer by use of the one or more barcode scanning devices. The steps performed by the second computer can then include storing decoded contents of the transactional data in the more permanent storage associated with the second network, responsive to an indication from decoded contents of the one or more verification files of successful transmission of contents of the transactional data from the first network to the second network.

In some circumstances, one or more representations of contents of the transactional data can be displayed on one or more of the one or more displays of the first computer when the one or more data barcodes are displayed on one or more of the one or more displays of the first computer. Similarly, one or more representations of contents of the one or more verification files can be displayed on one or more of the one or more displays of the first computer when the one or more verification barcodes are displayed on one or more of the one or more displays of the first computer. Further, in some instances, the memory medium can further include computer-readable instructions stored therein that when executed cause the second computer to perform additional steps. An additional step can include, for example—after decoding the one or more data barcodes—transferring decoded contents of the transactional data to the temporary storage associated with the second network to thereby store decoded contents of the transactional data in one or more validation files. Another additional step can include, after decoding the one or more data barcodes, displaying one or more representations of contents of the one or more validation files on one or more of the one or more displays of the second computer. Contents of the one or more validation files can be configured to include decoded contents of the transactional data, for example. Further, each of the one or more representations of contents of the respective transactional data, one or more validation files, and one or more verification files can be configured to include one or more of text and numbers.

In some systems according to an embodiment, the one or more barcode scanning devices can be positioned to enable scanning of the one or more displays of the first computer. Additionally, the data diode unit can include a first card configured to receive data to thereby define a receive card. The data diode unit can also include a second card configured to transmit data to thereby define a send card. The receive card can be configured to be in communication with the one or more processors of the first computer, and the send card can be configured to be in communication with the one or more processors of the second computer. Further, transmitting decoded contents of the transactional data from the second network to the first network through the data diode unit can include transmitting the decoded contents of the transactional data from the send card to the receive card through an optical link.

Additionally, in some systems according to an embodiment, the memory medium can further include computer-readable instructions stored therein that when executed cause the second computer to perform the step of discarding decoded contents of the transactional data, responsive to an indication from decoded contents of the one or more verification files of unsuccessful transmission of contents of the transactional data to the second network. Further, the first computer can also include one or more input and output units in communication with the one or more processors of the first computer and non-transitory memory medium in communication with the one or more processors of the first computer. The memory medium of the first computer, in turn, can include computer-readable instructions stored therein that when executed cause the first computer to perform a series of steps. The steps performed by the first computer can include, for example, generating the one or more data barcodes on one or more of the one or more displays of the first computer. The steps performed by the first computer can also include generating—responsive to a comparison of (1) contents of the transactional data and (2) the securely communicated decoded contents of the transactional data—the one or more verification barcodes on one or more of the one or more displays of the first computer.

Further, the one or more data barcodes can be configured to encode contents of the transactional data. Similarly, the one or more verification barcodes can be configured to encode contents of the one or more verification files.

In some instances, the first network can include a high-security network, and the second network can include a low-security network. Likewise, in some instances, the first network can include a low-security network, and the second network can include a high-security network. Further, decoding the one or more data barcodes can include disregarding error-correction capabilities of the one or more data barcodes. In addition, the one or more data barcodes and the one or more verification barcodes can include one or more of the following: two-dimensional matrix codes, QR Codes, Aztec Codes, and PDF417 codes. Likewise, a barcode scanning device can include one or more of the following: a barcode reading device, a QR Code reading device, a field-of-view barcode reading device, and a camera.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include, for example, decoding one or more barcodes indicative of contents of transactional data to thereby define one or more data barcodes. The transactional data can be associated with and positioned within a first network. Decoding the one or more data barcodes can thus produce contents of the transactional data represented by the one or more data barcodes. Decoding the one or more data barcodes can be responsive to receipt of a scan of a display of a first computer in communication with and positioned within the first network, for example. Further, decoding the one or more data barcodes can be by use of one or more barcode scanning devices in communication with a second computer positioned remote from the first computer and in communication with and positioned within a second network. The second network can be configured to have a different level of network security protection than the first network. Further, the second network can be configured to allow only one-way secure communication from the second network to the first network by use of a data diode unit. The operations can further include transmitting decoded contents of the transactional data from the second network to the first network through the data diode unit. Transmitting decoded contents of the transactional data can thereby securely communicate decoded contents of the transactional data in one-way communication from temporary storage associated with the second network to the first network for comparison to contents of the transactional data positioned within the first network.

The operations, for example, can then include decoding one or more different barcodes indicative of contents of one or more verification files to thereby define one or more verification barcodes. The one or more verification files can be configured to indicate success of transmission of contents of the transactional data from the first network to the second network. Decoding the one or more verification barcodes can produce contents of the one or more verification files represented by the one or more verification barcodes to thereby confirm success of the transmission of contents of the transactional data from the first network to the second network. Further, decoding the one or more verification barcodes can be responsive to receipt of a scan of the display of the first computer by use of the one or more barcode scanning devices. The operations can further include storing decoded contents of the transactional data in more permanent storage associated with the second network, responsive to an indication from decoded contents of the one or more verification files of successful transmission of contents of the transactional data from the first network to the second network.

In some circumstances, the operations can also include displaying one or more representations of contents of the transactional data on the display of the first computer when the one or more data barcodes are generated on the display of the first computer. The operations can further include—after decoding the one or more data barcodes—transferring decoded contents of the transactional data to the temporary storage associated with the second network. Transferring decoded contents of the transactional data to the temporary storage associated with the second network can thereby store decoded contents of the transactional data in one or more validation files. Contents of the one or more validation files can be configured to include decoded contents of the transactional data, for example. The operations can still further include displaying one or more representations of contents of the one or more validation files on the display of the second computer after decoding the one or more data barcodes and displaying one or more representations of contents of the one or more verification files on the display of the first computer when the one or more verification barcodes are generated on the display of the first computer. In addition, each of the one or more representations of contents of the respective transactional data, one or more validation files, and one or more verification files can be configured to include one or more of text and numbers.

Further, the data diode unit can include a first card configured to receive data to thereby define a receive card. The data diode unit can also include a second card configured to transmit data to thereby define a send card. While the receive card can be configured to be in communication with the first computer, the send card can be configured to be in communication with the second computer. In addition, transmitting decoded contents of the transactional data from the second network to the first network through the data diode unit can include transmitting decoded contents of the transactional data from the send card to the receive card through an optical link.

The operations can further include generating the one or more data barcodes on the display of the first computer. Additionally, the operations can include generating the one or more verification barcodes on the display of the first computer, responsive to a comparison of (1) the securely communicated decoded contents of the transactional data and (2) contents of the transactional data. The operations can still further include discarding decoded contents of the transactional data, responsive to an indication from decoded contents of the one or more verification files of unsuccessful transmission of contents of the transactional data to the second network. In some instances, the one or more data barcodes can be configured to encode contents of the transactional data. Likewise, the one or more verification barcodes can be configured to encode contents of the one or more verification files.

In some instances, the first network can include a high-security network, and the second network can include a low-security network. Alternatively, the first network can include a low-security network, and the second network can include a high-security network. Further, decoding the one or more data barcodes can include disregarding error-correction capabilities of the one or more data barcodes. The one or more data barcodes and the one or more verification barcodes can include one or more of the following: two-dimensional matrix codes, QR Codes, Aztec Codes, and PDF417 codes. Similarly, a barcode scanning device can include one or more of the following: a barcode reading device, a QR Code reading device, a field-of-view barcode reading device, and a camera.

For example, an entity can use an embodiment of the invention to transmit transactional data from a low-security network to a high-security network. Transactional data (sometimes called "transactional database records" or simply "database records") can include, for instance, customer order data stored on the entity's organizational network, such as a corporate network. The entity can wish to transmit the transactional data from the organizational network to a process automation system network, for example, to thereby enable a process automation system to fulfill the customer order. In such circumstances, the organizational network can be a low-security network, and the process automation system network can be a high-security network. Further, the organizational network can therefore be a first network, and the process automation system network can be a second network, according to an embodiment of the invention. The entity can advantageously use an embodiment of the invention to transmit contents of the transactional data from the organizational network to the process automation system network by use of a barcode scanning device, for example. Then, the entity can use a one-way data diode unit to transmit decoded contents of the transactional data—as received—to the organizational network for verification purposes. As a result, the entity is able to transmit transactional data from the low-security network to the high-security network while greatly reducing the risk of unauthorized access to the high-security network, for example.

In some circumstances, a physically secured room can be used to house one or more components of the first computer and the second computer. A physically secured room, e.g., a "clean room," can include a secure, restricted-access room into which removable media is not permitted. Data transfers according to an embodiment of the invention can be performed in a physically secured room, for instance, to further increase the security protection of a high-security network. For example, a physically secured room can contain at least a display of the first computer and a barcode scanning device in communication with the second computer. The barcode scanning device can be positioned so as to enable it to capture one or more barcodes on the display of the first computer. As a result, transmission of transactional data from one network to another, according to an embodiment of the invention, can occur at least partially in a physically secured room environment. The use of a physically secured room can therefore further minimize or eliminate any risk of intrusion or unauthorized access to a high-security network, for example.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Figure 12A:
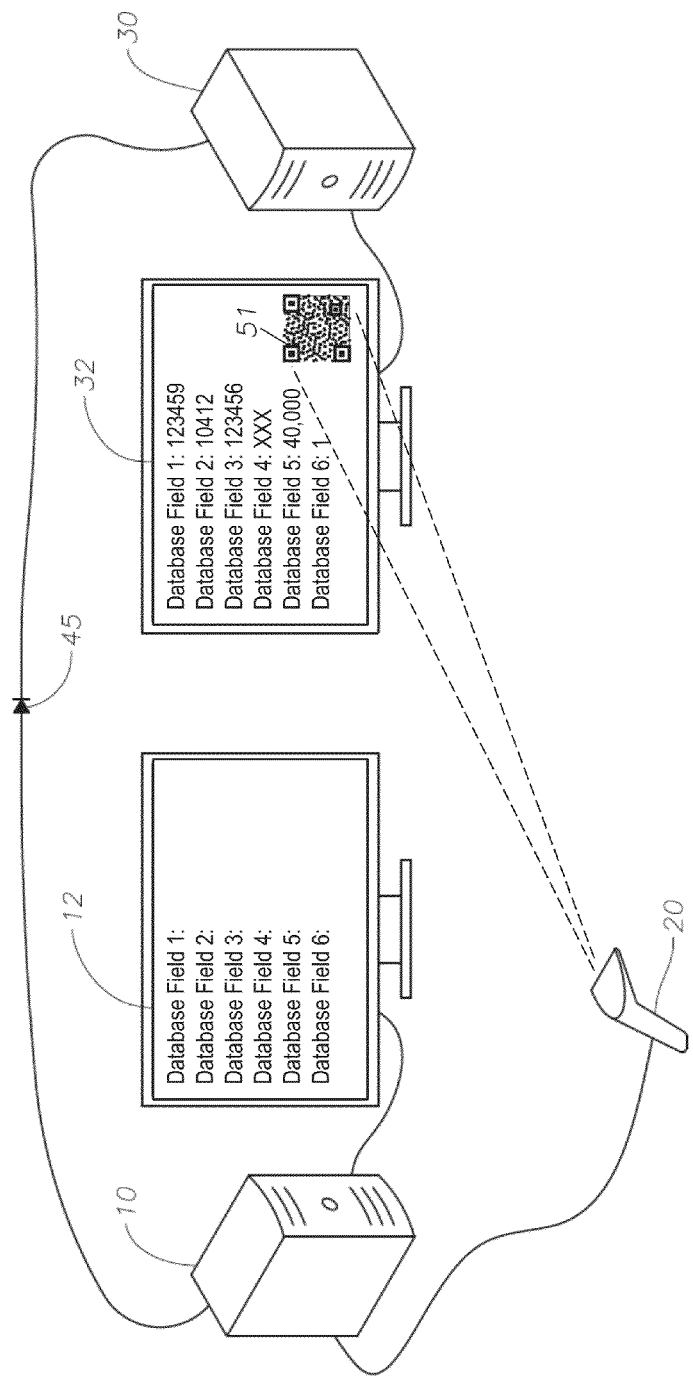
FIG. 12a is a schematic diagram of a system to transfer data between two or more networks configured to have different levels of network protection according to an embodiment of the invention.
Figure 12B:
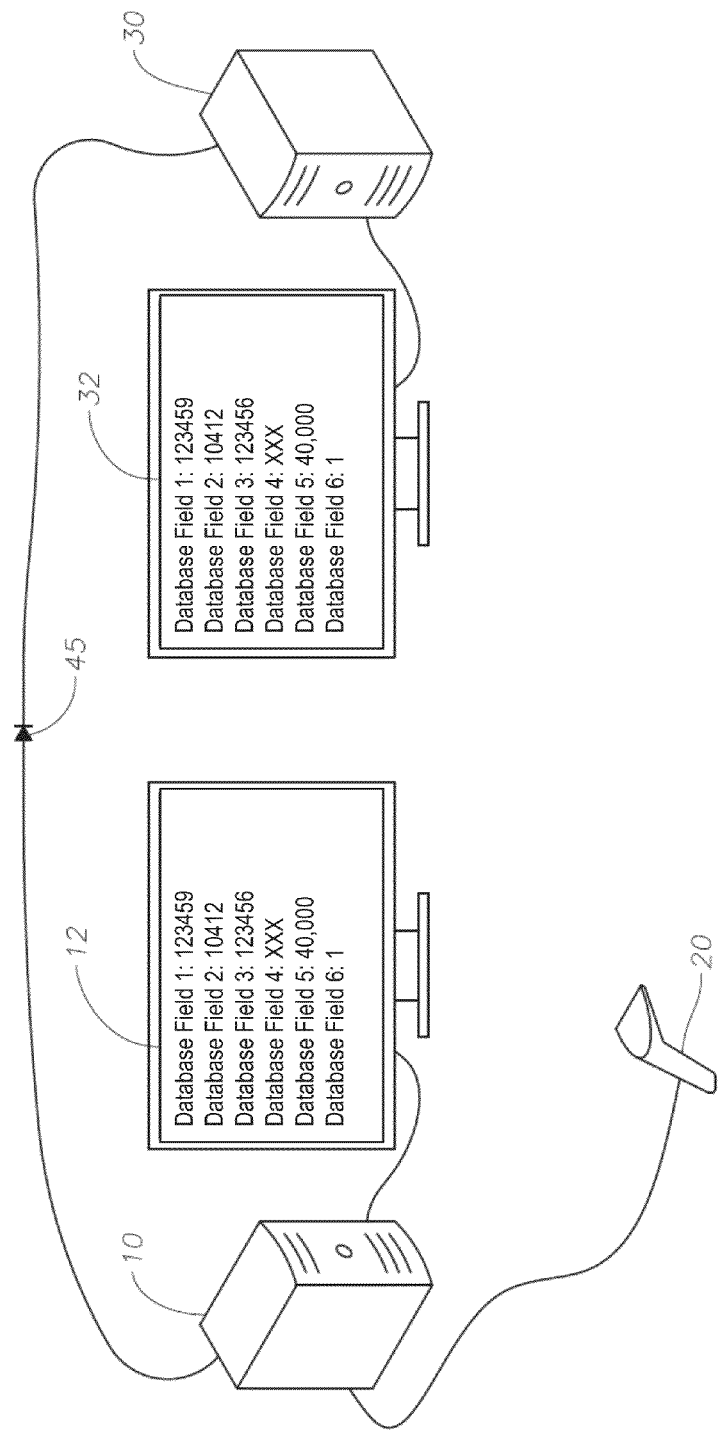
FIG. 12b is a schematic diagram of a system to transfer data between two or more networks configured to have different levels of network protection according to an embodiment of the invention.
Figure 13:
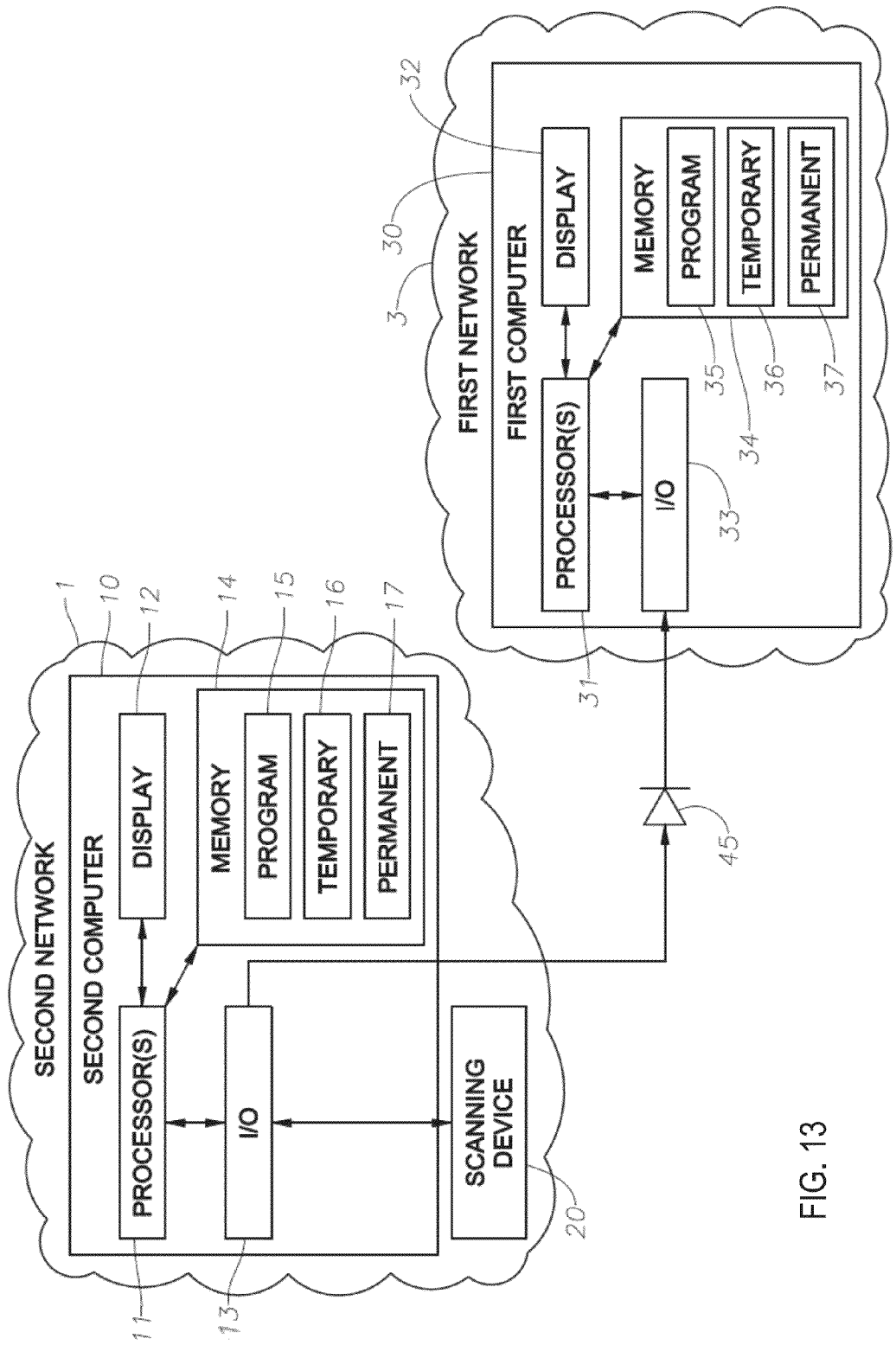
FIG. 13 is a schematic diagram of a system to transfer data between two or more networks configured to have different levels of network protection according to an embodiment of the invention.

A computer-implemented method to transfer data between two or more networks configured to have different levels of network protection, according to an embodiment of the invention, for example, can include decoding one or more barcodes indicative of contents of transactional data to thereby define one or more data barcodes 51, as illustrated in FIG. 12a, for example. The transactional data can be associated with and positioned within a first network 3, for example, as illustrated in FIG. 13. Decoding the one or more data barcodes 51 can be responsive to receipt of a scan of a display 32 of a first computer 30 in communication with and positioned within the first network 3, as illustrated in FIG. 12a, for example. Further, decoding the one or more data barcodes 51 can be by use of one or more barcode scanning devices 20 in communication with a second computer 10. The second computer 10 can be positioned remote from the first computer 30 and in communication with and positioned within a second network 1. The second network 1 can be configured to have a different level of network security protection than the first network 3. Further, the second network 1 can be configured to allow only one-way secure communication from the second network 1 to the first network 3 by use of a data diode unit 45. Decoding the one or more data barcodes 51 can thus produce contents of the transactional data represented by the one or more data barcodes 51. A method can then include transmitting decoded contents of the transactional data from the second network 1 to the first network 3 through the data diode unit 45, as illustrated in FIG. 12b, for example. Transmitting decoded contents of the transactional data can thereby securely communicate decoded contents of the transactional data in one-way communication from temporary storage associated with the second network 1 to the first network 3 for comparison to contents of the transactional data positioned within the first network 3. Temporary storage associated with the second network 1 can include, for example, temporary storage 16 of the second computer 10, as illustrated, for example, in FIG. 13.

Figure 12C:
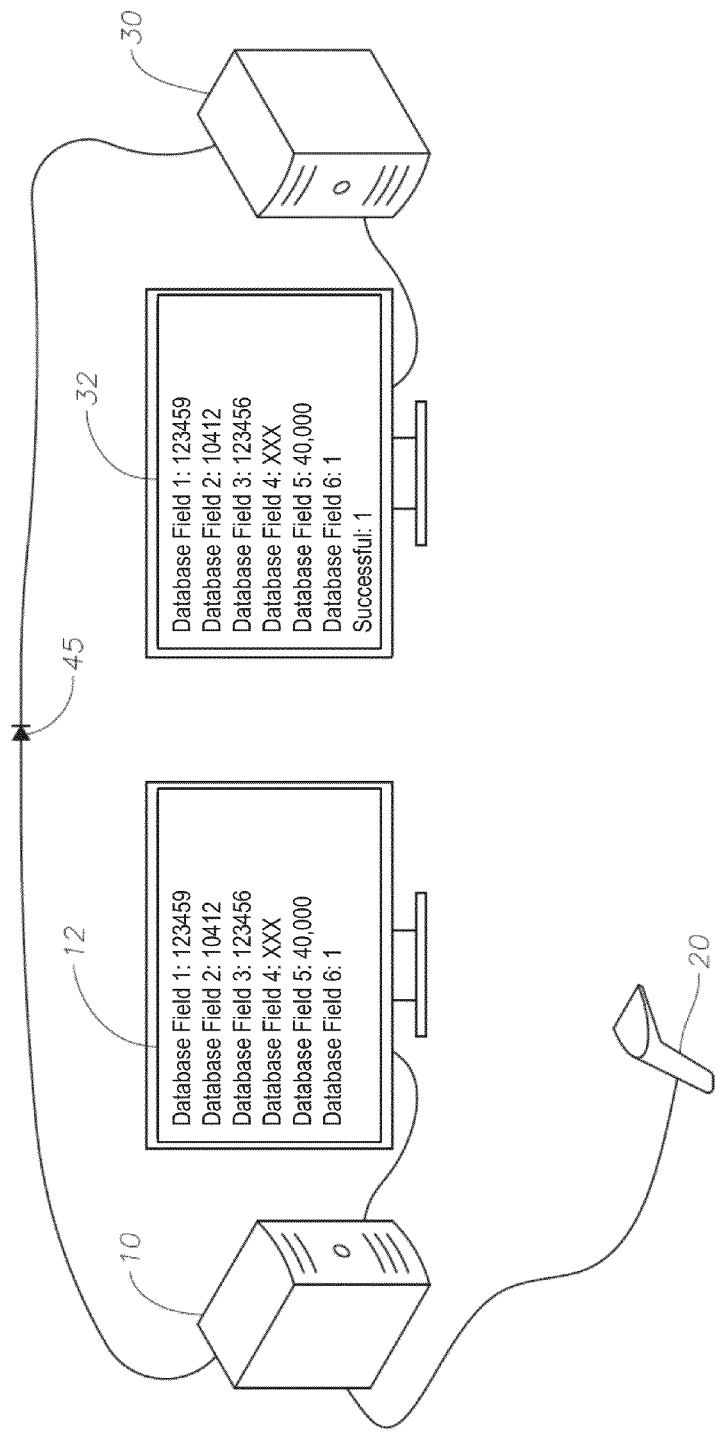
FIG. 12c is a schematic diagram of a system to transfer data between two or more networks configured to have different levels of network protection according to an embodiment of the invention.
Figure 12D:
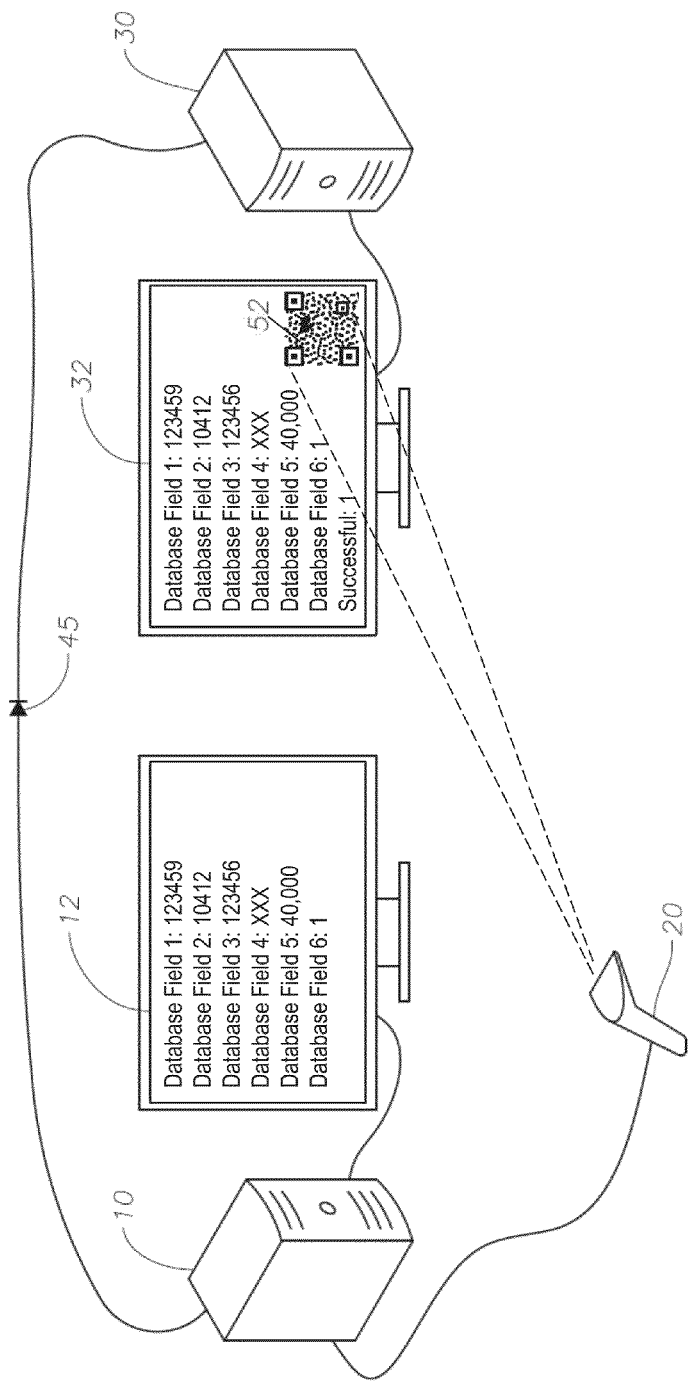
FIG. 12d is a schematic diagram of a system to transfer data between two or more networks configured to have different levels of network protection according to an embodiment of the invention.
Figure 12E:
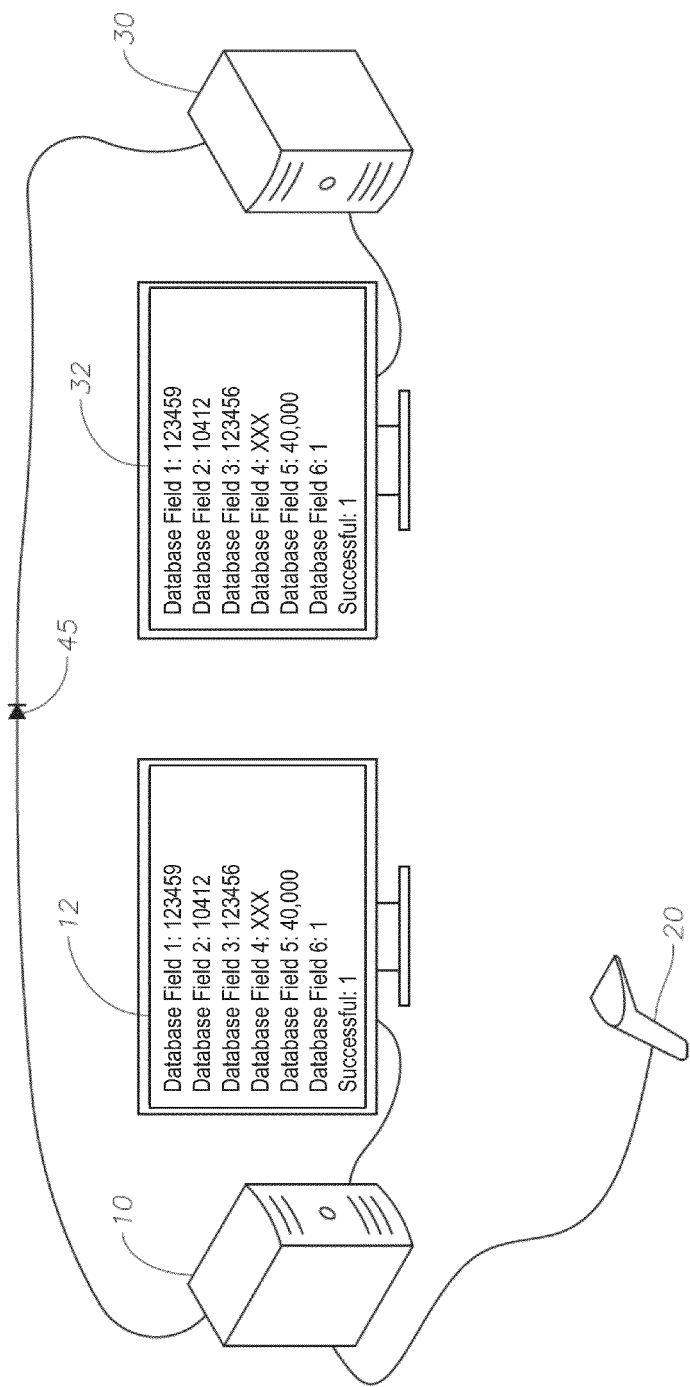
FIG. 12e is a schematic diagram of a system to transfer data between two or more networks configured to have different levels of network protection according to an embodiment of the invention.

A method can further include decoding one or more different barcodes indicative of contents of one or more verification files to thereby define one or more verification barcodes 52, as illustrated, for example, in FIG. 12d. The one or more verification barcodes 52 can be configured to encode contents of the one or more verification files. Moreover, the one or more verification files can be configured to indicate success of transmission of contents of the transactional data from the first network 3 to the second network 1. As a result, decoding the one or more verification barcodes 52 can produce contents of the one or more verification files represented by the one or more verification barcodes 52 to thereby confirm success of the transmission of contents of the transactional data from the first network 3 to the second network 1. Further, decoding the one or more verification barcodes 52 can be responsive to receipt of a scan of the display 32 of the first computer 30 by use of the one or more barcode scanning devices 20. A method can then include storing decoded contents of the transactional data in more permanent storage associated with the second network 1, responsive to an indication from decoded contents of the one or more verification files of successful transmission of contents of the transactional data from the first network 3 to the second network 1, as illustrated in FIG. 12e, for example. More permanent storage associated with the second network 1 can include, for example, permanent storage 17 of the second computer 10, as illustrated, for example, in FIG. 13.

In some instances, method can also include displaying one or more representations of contents of the transactional data on the display 32 of the first computer 30 when the one or more data barcodes 51 are generated on the display 32 of the first computer 30, as illustrated, for example, in FIG. 12a. A method can further include, after decoding the one or more data barcodes 51, transferring decoded contents of the transactional data to the temporary storage associated with the second network 1, e.g., temporary storage 16. Transferring decoded contents of the transactional data to the temporary storage associated with the second network 1 can thereby store decoded contents of the transactional data in one or more validation files. Contents of the one or more validation files can be configured to include decoded contents of the transactional data, for example. A method can still further include displaying one or more representations of contents of the one or more validation files on the display 12 of the second computer 10 after decoding the one or more data barcodes 51, as illustrated in FIG. 12b, for example. Further, a method can also include displaying one or more representations of contents of the one or more verification files on the display 32 of the first computer 30 when the one or more verification barcodes 52 are generated on the display 32 of the first computer 30, as illustrated, for example, in FIG. 12d. Each of the one or more representations of contents of the respective transactional data, one or more validation files, and one or more verification files can be configured to include one or more of text and numbers, for example. For example, as depicted in FIG. 12a, representations of contents of the transactional data on the display 32 of the first computer 30 can include text and numbers indicating that Database Field 1 has a value of 123459, Database Field 2 has a value of 10412, Database Field 3 has a value of 123456, Database Field 4 has a value of XXX, Database Field 5 has a value of 40,000, and Database Field 6 has a value of 1. Similarly, as depicted in FIG. 12b, for instance, representations of contents of the one or more validation files on the display 12 of the second computer 10 can include text and numbers indicating that Database Field 1 has a value of 123459, Database Field 2 has a value of 10412, Database Field 3 has a value of 123456, Database Field 4 has a value of XXX, Database Field 5 has a value of 40,000, and Database Field 6 has a value of 1. Further, the one or more representations of contents of the one or more verification files can be configured to include one or more numbers, as well, such as a "1" to indicate successful transmission of contents of the transactional data, for example, as illustrated in FIG. 12d.

Further, the data diode unit 45 can include a first card configured to receive data to thereby define a receive card. The data diode unit 45 can also include a second card configured to transmit data to thereby define a send card. While the receive card can be configured to be in communication with the first computer 30, the send card can be configured to be in communication with the second computer 10. In addition, transmitting decoded contents of the transactional data from the second network 1 to the first network 3 through the data diode unit 45 can include transmitting decoded contents of the transactional data from the send card to the receive card through an optical link.

In addition, a method can include generating the one or more data barcodes 51 on the display 32 of the first computer 30, as illustrated in FIG. 12a, for example. A method can also include generating the one or more verification barcodes 52 on the display 32 of the first computer 30, responsive to a comparison of (1) the securely communicated decoded contents of the transactional data and (2) contents of the transactional data positioned in the first network 3. As illustrated in FIG. 12c, for example, the first computer 30 can determine whether the comparison indicates that the contents of the transactional data were successfully transmitted prior to generating the one or more verification barcodes 52. A method can still further include discarding decoded contents of the transactional data in the temporary storage associated with the second network 1, responsive to an indication from decoded contents of the one or more verification files of unsuccessful transmission of contents of the transactional data to the second network 1. The one or more data barcodes 51 can be configured to encode contents of the transactional data. Similarly, the one or more verification barcodes 52 can be configured to encode contents of the one or more verification files. In some circumstances, a single data barcode 51 can be sufficient to encode contents of the transactional data, as illustrated in FIG. 12a, for example. Likewise, a single verification barcode 52 can be sufficient to encode contents of the one or more verification files, in some instances, as illustrated in FIG. 12d, for example.

In some circumstances, the first network 3 can include a high-security network, and the second network 1 can include a low-security network. Conversely, in other circumstances, the first network 3 can include a low-security network, and the second network 1 can include a high-security network.

Figure 10B:
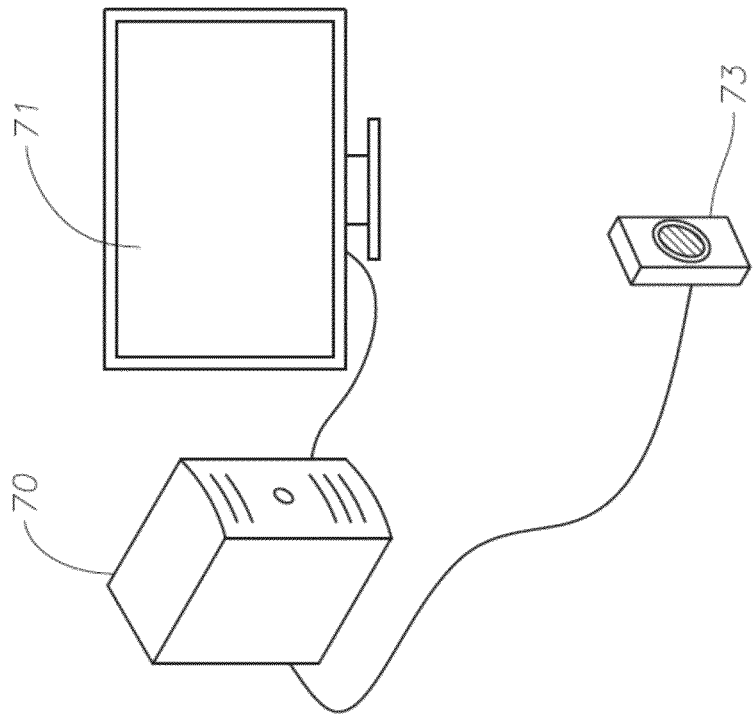
FIG. 10b is a schematic diagram of some of the elements of a system to transfer data between two or more networks configured to have different levels of network protection according to an embodiment of the invention.
Figure 10A:
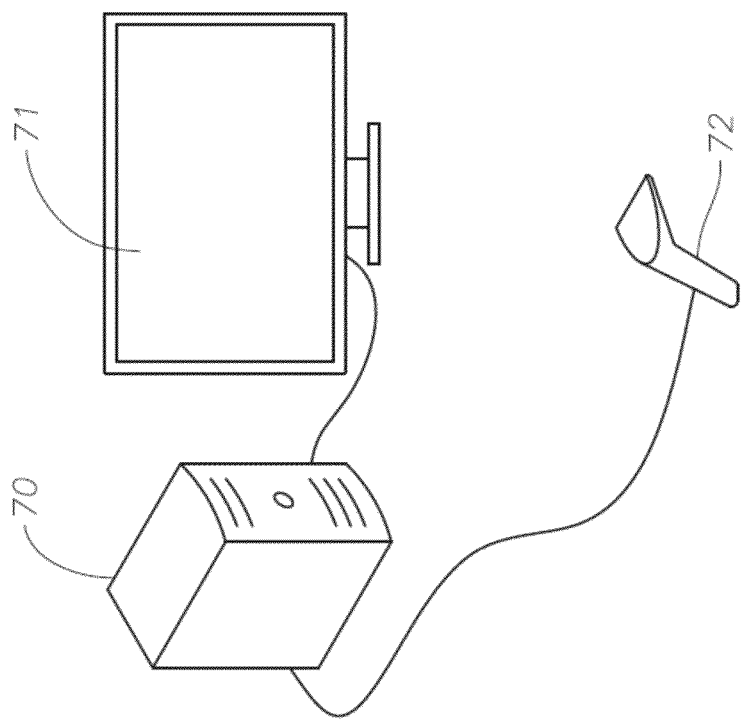
FIG. 10a is a schematic diagram of some of the elements of a system to transfer data between two or more networks configured to have different levels of network protection according to an embodiment of the invention.

Barcodes and a barcode scanning device 20 can include additional distinctive features. For example, in some cases, the one or more data barcodes 51 and the one or more verification barcodes 52 can include one or more of the following, as will be understood by those skilled in the art: two-dimensional matrix codes, QR Codes, Aztec Codes, and PDF417 codes. Additionally, a barcode scanning device 20 can include one or more of the following, as will be understood by those skilled in the art: a barcode reading device 72, a QR Code reading device, a field-of-view barcode reading device 73, and a camera, as illustrated, for example, in FIG. 10a and FIG. 10b. In FIG. 10a, a computer 70 is depicted as connected to a display 71 and a barcode reading device 72, for example. Similarly, in FIG. 10b, a computer 70 is depicted as connected to a field-of-view barcode reading device 73, in addition to a display 71. A barcode scanning device 20 can have the ability to scan more than one barcode simultaneously. Decoding the one or more data barcodes 51 can include disregarding error-correction capabilities of the one or more data barcodes 51.

Figure 8:
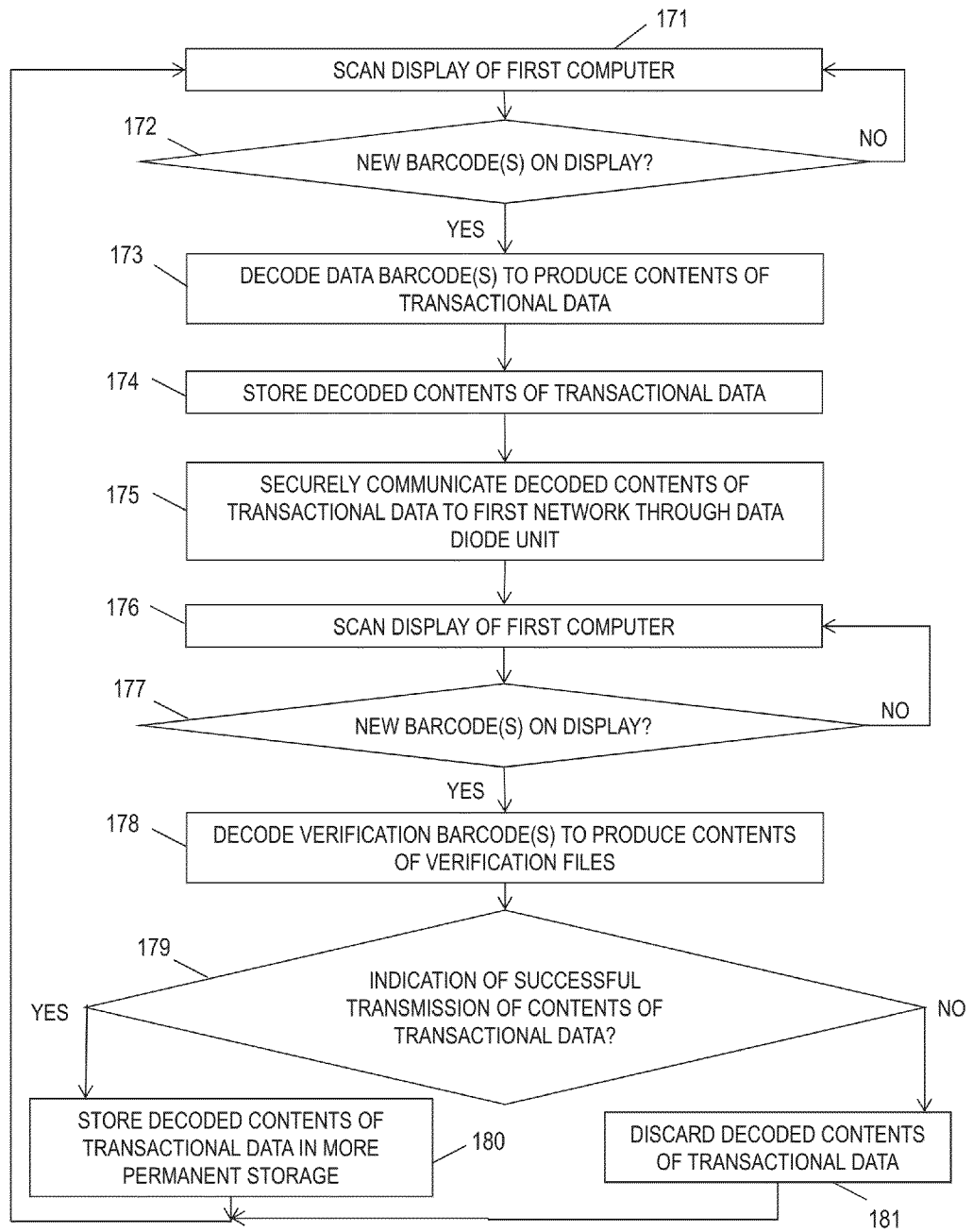
FIG. 8 is a schematic method flow diagram of a method to transfer data between two or more networks configured to have different levels of network protection according to an embodiment of the invention.

In some circumstances, a method can include steps performed by the second computer 10. For example, after scanning 171 a display 32 of the first computer 30, a method can include determining 172 whether one or more new data barcodes 51 are on the display 32, as illustrated, for example, in FIG. 8. If the display 32 does not depict any new data barcodes 51, a method can include scanning 171 the display 32 again. If the display 32 depicts one or more new data barcodes 51, a method can include decoding 173 the one or more data barcodes 51 to produce contents of transactional data. A method can then include storing 174 decoded contents of the transactional data. A method can further include securely communicating 175 decoded contents of the transactional data to the first network 3 through the data diode unit 45. A method can still further include scanning 176 a display 32 of the first computer 30 then determining 177 whether one or more new verification barcodes 52 are on the display 32. If the display 32 does not depict any new verification barcodes 52, a method can include scanning 176 the display 32 again. If the display 32 depicts one or more new verification barcodes 52, a method can include decoding 178 the one or more verification barcodes 52 to produce contents of one or more verification files. A method can then include determining 179 whether contents of the one or more verification files indicate a successful transmission of contents of the transactional data from the first network 3 to the second network 1. If successful transmission is indicated, a method can include storing 180 decoded contents of the transactional data in more permanent storage then scanning 171 a display 32 of the first computer 30 in anticipation of transmission of additional contents of transactional data encoded in data barcodes 51. If unsuccessful transmission is indicated, a method can include discarding 181 decoded contents of the transactional data then scanning 171 a display 32 of the first computer 30 in anticipation of transmission of additional contents of transactional data encoded in data barcodes 51.

Figure 11:
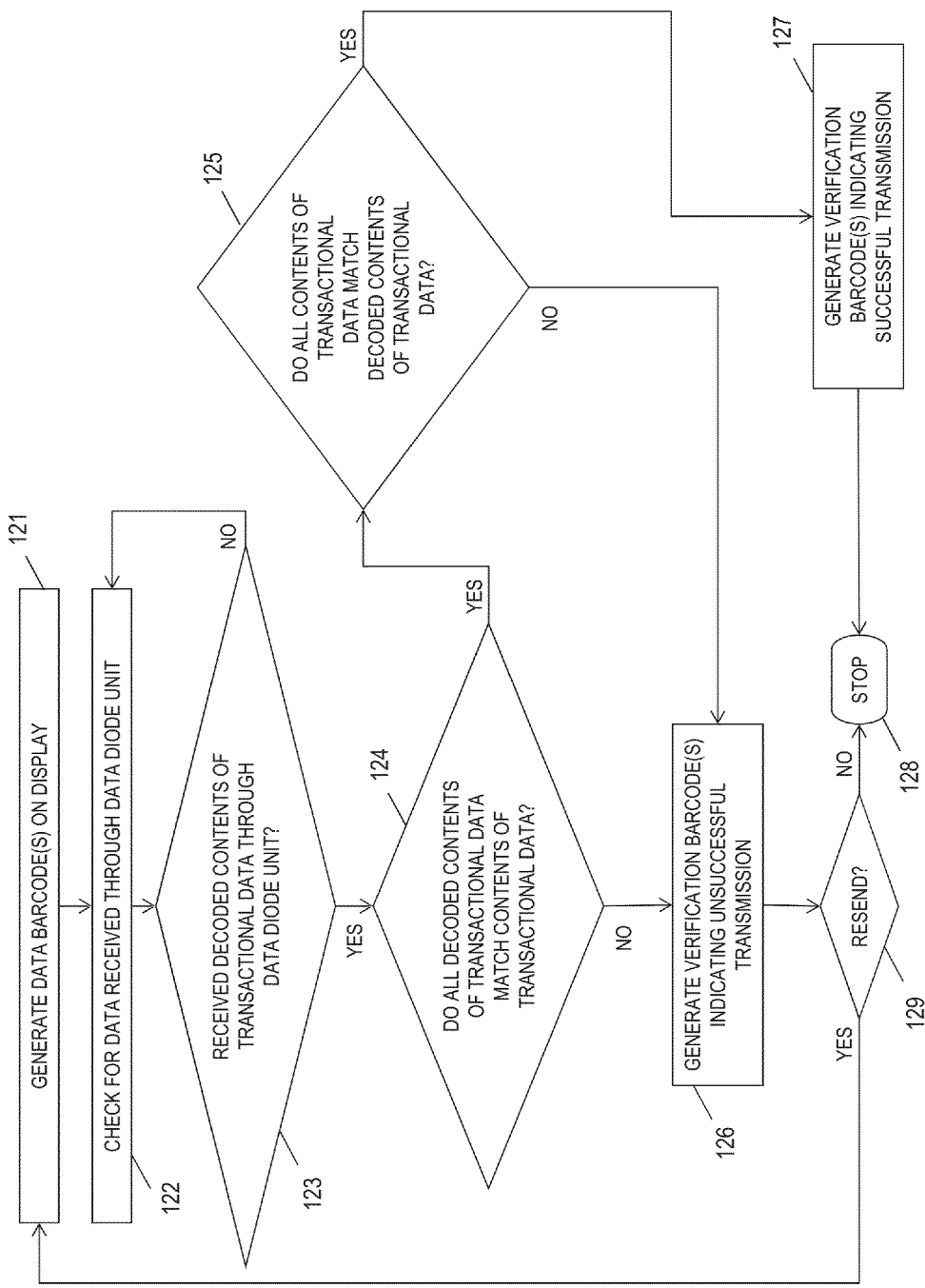
FIG. 11 is a schematic method flow diagram of a method to transfer data between two or more networks configured to have different levels of network protection according to an embodiment of the invention.

Similarly, a method can in some instances include steps performed by the first computer 30. For example, as illustrated in FIG. 11, after generating 121 data barcodes 51 on a display 32 of the first computer 30, a method according to an embodiment of the invention can include checking 122 for data received through a one-way data diode unit 45 then determining 123 whether decoded contents of the transactional data have been received through a one-way data diode unit 45. If decoded contents of the transactional data have not been received through a one-way data diode unit 45, a method can include checking 122 again. If decoded contents of the transactional data have been received through a one-way data diode unit 45, a method can then include determining 124 whether all securely communicated decoded contents of the transactional data match contents of the transactional data positioned in the first network 3. If so, a method can then include determining 125 whether all contents of the transactional data match the securely communicated decoded contents of the transactional data. If all contents of the transactional data match the securely communicated decoded contents of the transactional data, a method can include generating 127 one or more verification barcodes 52 indicating successful transmission of contents of the transactional data from the first network 3 to the second network 1 then stopping 128. If not all securely communicated decoded contents of the transactional data match contents of the transactional data positioned in the first network 3—that is, if step 124 is determined to be "no"—or if not all contents of the transactional data match the securely communicated decoded contents of the transactional data—that is, if step 125 is determined to be "no"—a method can include generating 126 one or more verification barcodes 52 indicating unsuccessful transmission of contents of the transactional data from the first network 3 to the second network 1. A method can then include determining 129 whether to resend contents of the transactional data. If contents of the transactional data are not to be resent, a method can stop 128. If contents of the transactional data are to be resent, a method can include again generating 121 one or more data barcodes 51 on a display 32 of the first computer 30.

An embodiment can also include a system to transfer data between two or more networks configured to have different levels of network protection. For example, a system according to an embodiment can include a first computer 30 in communication with and positioned within a first network 3. The first computer 30 can include one or more processors 31 and one or more displays 32 in communication with the one or more processors 31. A system can further include a data diode unit 45 in communication with one or more processors 11 of a second computer 10 and positioned to transmit data from the second computer 10 to the first network 3, for example. Still further, a system can include the second computer 10. The second computer 10 can be positioned remote from the first computer 30 and in communication with and positioned within a second network 1. The second network 1 can be configured to have temporary storage and separate more permanent storage associated therewith. For example, temporary storage associated with the second network 1 can include temporary storage 16 of the second computer 10, for example, as illustrated in FIG. 13. More permanent storage associated with the second network 1 can include permanent storage 17 of the second computer 10, for example. Additionally, the second network 1 can be further configured to have a different level of network security protection than the first network 3 and to allow only one-way secure communication from the second network 1 to the first network 3 through the data diode unit 45. Each of the first computer 30 and the second computer 10 can be, for example, a hardened server. Furthermore, the second computer 10 can include one or more processors 11 and one or more input and output units 13 in communication with the one or more processors 11 of the second computer 10. The second computer 10 can also include one or more barcode scanning devices 20 in communication with the one or more processors 11 of the second computer 10. In addition, the second computer 10 can include non-transitory memory medium 14 in communication with the one or more processors 11 of the second computer 10. The memory medium 14 can include computer-readable instructions stored therein that when executed cause the second computer to perform a series of steps. The computer-readable instructions can include, for example, a computer program 15, as illustrated in FIG. 13, for example.

The steps performed by the second computer 10 can include, for example, decoding one or more barcodes indicative of contents of transactional data to thereby define one or more data barcodes 51. The transactional data can be associated with and positioned within the first network 3, for example. Decoding the one or more data barcodes 51 can be responsive to receipt of a scan of one or more of the one or more displays 32 of the first computer 30 by use of the one or more barcode scanning devices 20. A scan of the one or more of the one or more displays 32 according to an embodiment can be automatically triggered by generation of one or more data barcodes 51 on one or more of the one or more displays 32, for example. Further, decoding the one or more data barcodes 51 can produce contents of the transactional data represented by the one or more data barcodes 51. The steps performed by the second computer 10 can then include transmitting decoded contents of the transactional data from the second network 1 to the first network 3 through the data diode unit 45. Transmitting decoded contents of the transactional data from the second network 1 to the first network 3 can thereby securely communicate the decoded contents of the transactional data in one-way communication from the temporary storage associated with the second network 1 to the first network 3 for comparison to contents of the transactional data positioned within the first network 3. The steps performed by the second computer 10 can further include decoding one or more different barcodes indicative of contents of one or more verification files to thereby define one or more verification barcodes 52. The one or more verification barcodes 52 can be configured to encode contents of the one or more verification files. As a result, decoding the one or more verification barcodes 52 can produce contents of the one or more verification files represented by the one or more verification barcodes 52. Further, the one or more verification files can be configured to indicate success of transmission of contents of the transactional data from the first network 3 to the second network 1. Consequently, decoding the one or more verification barcodes 52 can thereby confirm success of the transmission of contents of the transactional data from the first network 3 to the second network 1. Decoding the one or more verification barcodes 52 can be responsive to receipt of a scan of one or more of the one or more displays 32 of the first computer by use of the one or more barcode scanning devices 20. The steps performed by the second computer 10 can then include storing decoded contents of the transactional data in the more permanent storage associated with the second network 1, responsive to an indication from decoded contents of the one or more verification files of successful transmission of contents of the transactional data from the first network 3 to the second network 1. The one or more of the one or more displays 32 can then be cleared, for example.

In some instances, one or more representations of contents of the transactional data can be displayed on one or more of the one or more displays 32 of the first computer 30 when the one or more data barcodes 51 are displayed on one or more of the one or more displays 32 of the first computer 30. Similarly, one or more representations of contents of the one or more verification files can be displayed on one or more of the one or more displays 32 of the first computer 30 when the one or more verification barcodes 52 are displayed on one or more of the one or more displays 32 of the first computer 30. Further, in some circumstances, the memory medium 14 of the second computer 10 can further include computer-readable instructions stored therein that when executed cause the second computer 10 to perform additional steps. For example, additional steps performed by the second computer 10 can include—after decoding the one or more data barcodes 51—transferring decoded contents of the transactional data to the temporary storage associated with the second network 1 to thereby store decoded contents of the transactional data in one or more validation files. Steps can further include, after decoding the one or more data barcodes 51, displaying one or more representations of contents of the one or more validation files on one or more of the one or more displays 12 of the second computer 10. For example, contents of the one or more validation files can be configured to include decoded contents of the transactional data. Each of the one or more representations of contents of the respective transactional data, one or more validation files, and one or more verification files can be configured to include one or more of text and numbers, for example.

In some systems according to an embodiment, the one or more barcode scanning devices 20 can be positioned to enable scanning of the one or more displays 32 of the first computer 30. Additionally, the data diode unit 45 can include a first card configured to receive data to thereby define a receive card. The data diode unit 45 can also include a second card configured to transmit data to thereby define a send card. The receive card can be configured to be in communication with the one or more processors 31 of the first computer 30, and the send card can be configured to be in communication with the one or more processors 11 of the second computer 10. Further, transmitting decoded contents of the transactional data from the second network 1 to the first network 3 through the data diode unit 45 can include transmitting decoded contents of the transactional data from the send card to the receive card through an optical link.

Additionally, in some systems according to an embodiment, the memory medium 14 can further include computer-readable instructions stored therein that when executed cause the second computer 10 to perform the step of discarding decoded contents of the transactional data, responsive to an indication from decoded contents of the one or more verification files of unsuccessful transmission of contents of the transactional data to the second network 1. Further, the first computer 30 can also include one or more input and output units 33 in communication with the one or more processors 31 of the first computer 30 and non-transitory memory medium 34 in communication with the one or more processors 31 of the first computer 30. The memory medium 34 of the first computer, in turn, can include computer-readable instructions stored therein that when executed cause the first computer to perform a series of steps. The computer-readable instructions can include, for example, a computer program 35, as illustrated in FIG. 13, for example. The memory medium 34 can also include temporary storage 36 and permanent storage 37, for example, in some circumstances. The steps performed by the first computer 30 can include, for example, generating the one or more data barcodes 51 on one or more of the one or more displays 32 of the first computer 30. The steps performed by the first computer 30 can also include generating—responsive to a comparison of (1) contents of the transactional data and (2) the securely communicated decoded contents of the transactional data—the one or more verification barcodes 52 on one or more of the one or more displays 32 of the first computer 30. Further, the one or more data barcodes 51 can be configured to encode contents of the transactional data. Similarly, the one or more verification barcodes 52 can be configured to encode contents of one or more verification files. In addition, the memory medium 34 of the first computer 30 can further include computer-readable instructions stored therein that when executed cause the first computer 30 to perform the step of displaying one or more representations of contents of the transactional data on one or more of the one or more displays 32 of the first computer 30 when the one or more data barcodes 51 are generated on one or more of the one or more displays 32 of the first computer 30, for example.

In some instances, the first network 3 can include a high-security network, and the second network 1 can include a low-security network. Likewise, in some instances, the first network 3 can include a low-security network, and the second network 1 can include a high-security network. Further, in some circumstances, decoding the one or more data barcodes 51 can include disregarding error-correction capabilities of the one or more data barcodes 51. Further, the one or more data barcodes 51 and the one or more verification barcodes 52 can include one or more of the following: two-dimensional matrix codes, QR Codes, Aztec Codes, and PDF417 codes. Likewise, a barcode scanning device 20 can include one or more of the following: a barcode reading device 72, a QR Code reading device, a field-of-view barcode reading device 73, and a camera.

Figure 9:
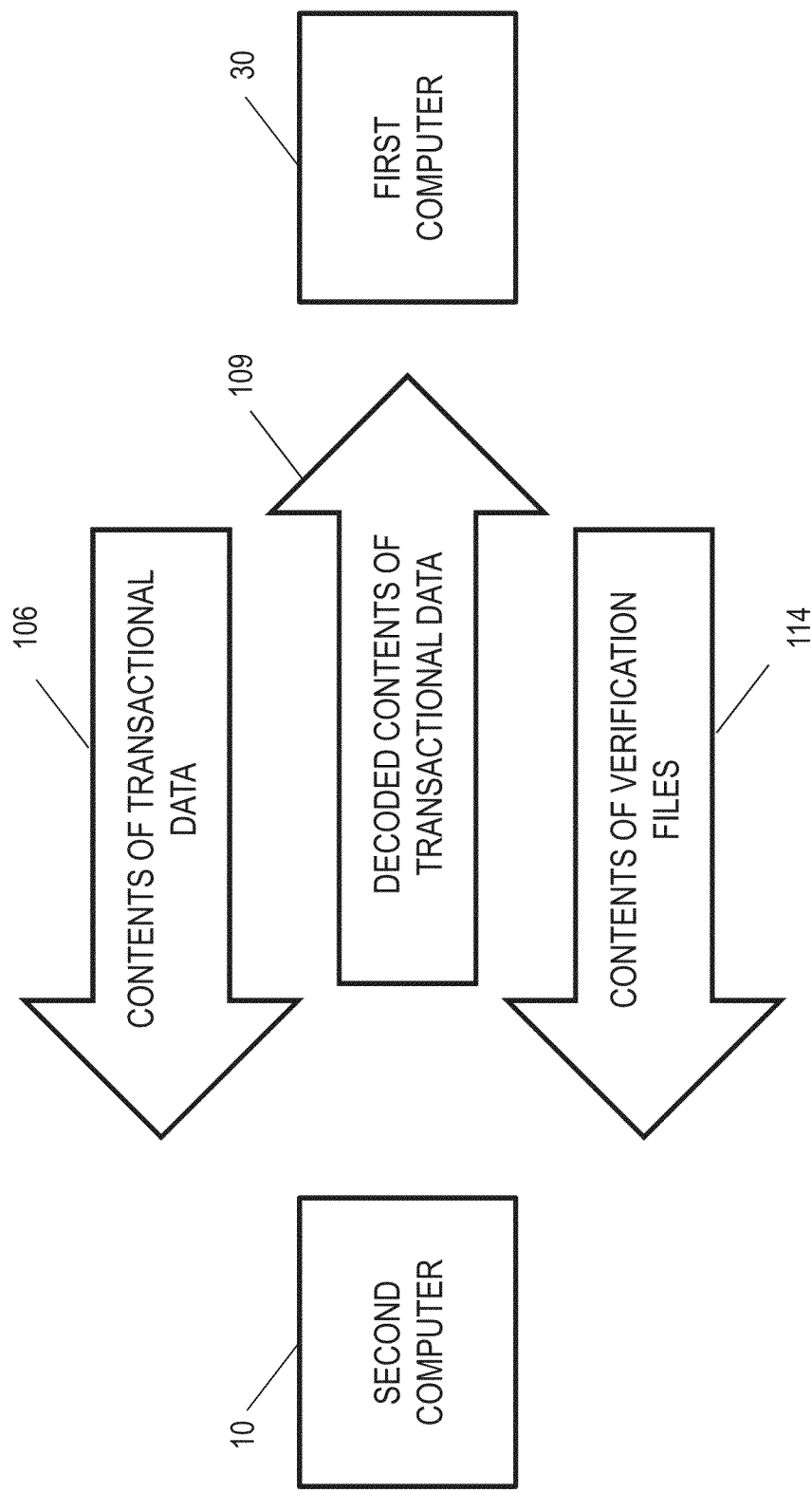
FIG. 9 is a schematic method flow diagram of a method to transfer data between two or more networks configured to have different levels of network protection according to an embodiment of the invention.

An exchange of information between the first computer 30 and the second computer 10 can thus include transmission of contents of transactional data 106 encoded in data barcodes 51 from the first computer 30 to the second computer 10, transmission of decoded contents of transactional data 109 from the second computer 10 to the first computer 30, and transmission of contents of verification files 114 from the first computer 30 to the second computer 10, as illustrated, for example, in FIG. 9.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include, for example, decoding one or more barcodes indicative of contents of transactional data to thereby define one or more data barcodes 51. The transactional data can be associated with and positioned within a first network 3. Decoding the one or more data barcodes 51 can thus produce contents of the transactional data represented by the one or more data barcodes 51. Decoding the one or more data barcodes 51 can be responsive to receipt of a scan of a display 32 of a first computer 30 in communication with and positioned within the first network 3, for example. Further, decoding the one or more data barcodes 51 can be by use of one or more barcode scanning devices 20 in communication with a second computer 10 positioned remote from the first computer 30 and in communication with and positioned within a second network 1. The second network 1 can be configured to have a different level of network security protection than the first network 3. Further, the second network 1 can be configured to allow only one-way secure communication from the second network 1 to the first network 3 by use of a data diode unit 45. The operations can further include transmitting decoded contents of the transactional data from the second network 1 to the first network 3 through the data diode unit 45. Transmitting decoded contents of the transactional data can thereby securely communicate decoded contents of the transactional data in one-way communication from temporary storage associated with the second network 1 to the first network 3 for comparison to contents of the transactional data positioned within the first network 3.

The operations, for example, can then include decoding one or more different barcodes indicative of contents of one or more verification files to thereby define one or more verification barcodes 52. The one or more verification barcodes 52 can be configured to encode contents of the one or more verification files. Further, the one or more verification files can be configured to indicate success of transmission of contents of the transactional data from the first network 3 to the second network 1. Decoding the one or more verification barcodes 52 can produce contents of the one or more verification files represented by the one or more verification barcodes 52 to thereby confirm success of the transmission of contents of the transactional data from the first network 3 to the second network 1. Further, decoding the one or more verification barcodes 52 can be responsive to receipt of a scan of the display 32 of the first computer 30 by use of the one or more barcode scanning devices 20. The operations can further include storing decoded contents of the transactional data in more permanent storage associated with the second network 1, responsive to an indication from decoded contents of the one or more verification files of successful transmission of contents of the transactional data from the first network 3 to the second network 1.

The operations can further include, in some circumstances, displaying one or more representations of contents of the transactional data on the display 32 of the first computer 30 when the one or more data barcodes 51 are generated on the display 32 of the first computer 30. Further, the operations can also include—after decoding the one or more data barcodes 51—transferring decoded contents of the transactional data to the temporary storage associated with the second network 1. Transferring decoded contents of the transactional data to the temporary storage associated with the second network 1 can thereby store decoded contents of the transactional data in one or more validation files. Further, contents of the one or more validation files can be configured to include decoded contents of the transactional data, for example. Additional operations can include displaying one or more representations of contents of the one or more validation files on the display 12 of the second computer 10 after decoding the one or more data barcodes 51. Operations can further include displaying one or more representations of contents of the one or more verification files on the display 32 of the first computer 30 when the one or more verification barcodes 52 are generated on the display 32 of the first computer 30. Each of the one or more representations of contents of the respective transactional data, one or more validation files, and one or more verification files can be configured to include one or more of text and numbers, for example.

In some circumstances, the data diode unit 45 can include a first card configured to receive data to thereby define a receive card. The data diode unit 45 can also include a second card configured to transmit data to thereby define a send card. While the receive card can be configured to be in communication with the first computer 30, the send card can be configured to be in communication with the second computer 10. In addition, transmitting decoded contents of the transactional data from the second network 1 to the first network 3 through the data diode unit 45 can include transmitting decoded contents of the transactional data from the send card to the receive card through an optical link.

The operations can further include generating the one or more data barcodes 51 on the display 32 of the first computer 30. Additionally, the operations can include generating the one or more verification barcodes 52 on the display 32 of the first computer 30, responsive to a comparison of (1) the securely communicated decoded contents of the transactional data and (2) contents of the transactional data. The operations can still further include discarding decoded contents of the transactional data, responsive to an indication from decoded contents of the one or more verification files of unsuccessful transmission of contents of the transactional data to the second network 1. In some instances, the one or more data barcodes 51 can be configured to encode contents of the transactional data. Likewise, the one or more verification barcodes 52 can be configured to encode contents of the one or more verification files.

In some instances, the first network 3 can include a high-security network, and the second network 1 can include a low-security network. Alternatively, the first network 3 can include a low-security network, and the second network 1 can include a high-security network. Further, decoding the one or more data barcodes 51 can include disregarding error-correction capabilities of the one or more data barcodes 51. The one or more data barcodes 51 and the one or more verification barcodes 52 can include one or more of the following: two-dimensional matrix codes, QR Codes, Aztec Codes, and PDF417 codes. Similarly, a barcode scanning device 20 can include one or more of the following: a barcode reading device 72, a QR Code reading device, a field-of-view barcode reading device 73, and a camera, for example.

Figure 14A:
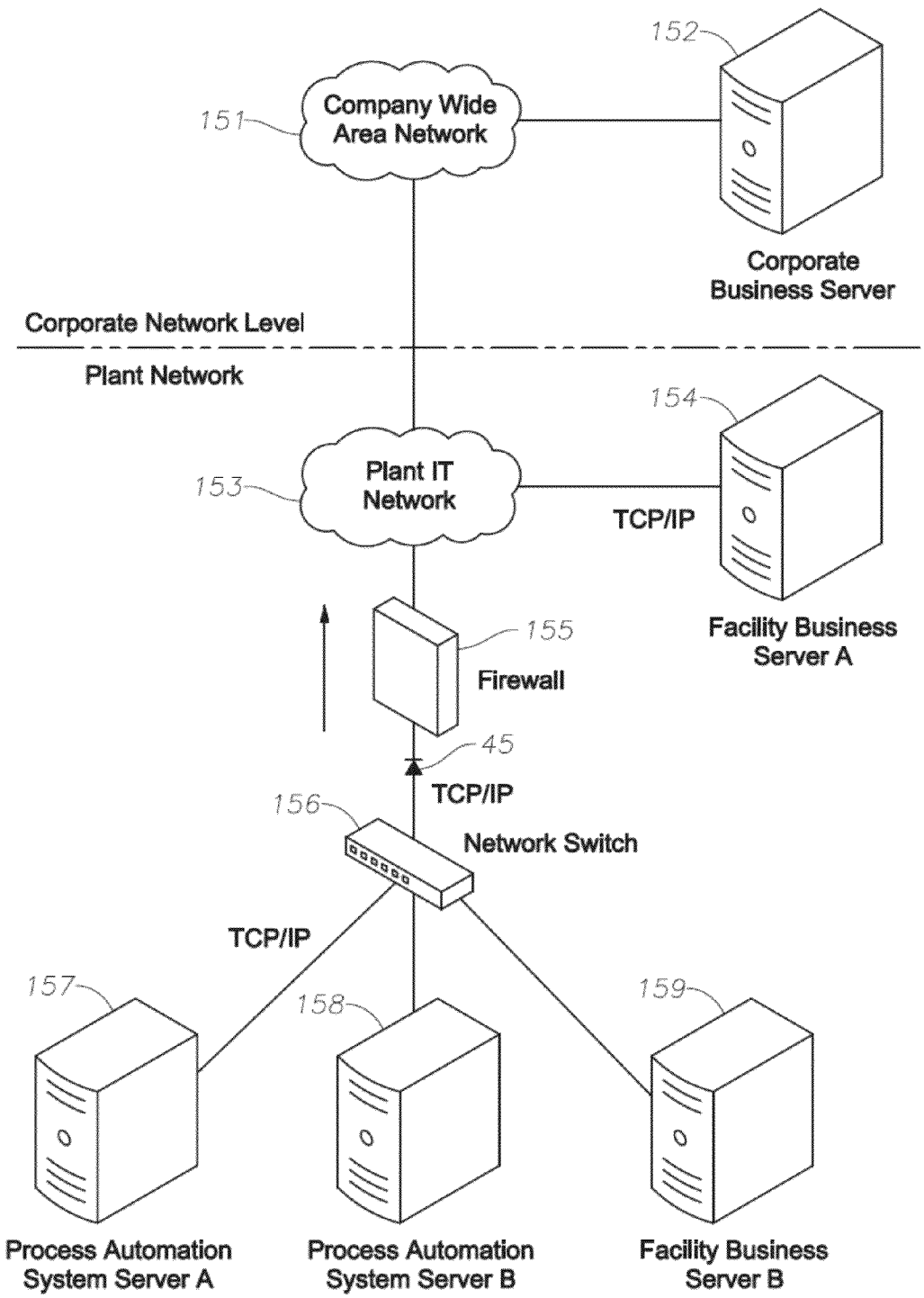
FIG. 14a is a schematic diagram of a system to transfer data between two or more networks configured to have different levels of network protection according to an embodiment of the invention.

Embodiments can exist and operate in arrangements including one-way data diode units 45, as illustrated, for example, in FIG. 14*a*. For instance, in some circumstances, one of the networks can be a high-security network (HSN). An HSN can be a critical network such as, for example, a process automation system (PAS) network that requires maximum security measures and protections to ensure business continuity. One of the networks can also be a low-security network (LSN), such as a corporate business network (CBN). For example, a CBN can be a lower security network than a PAS network because, in the event that data from a network of an entity were to be lost, a data loss from the CBN would not affect the business or operations of the entity as significantly as a data loss from the PAS network. Rather, a data loss from the CBN would have a smaller impact on the entity's operations. An embodiment of the invention can therefore advantageously minimize the risk of a cyber-security incident by eliminating the transmission of data from an LSN to an HSN through traditional networking methods.

An entity can use data diodes or data diode units to protect a process automation system network, for example. Data diode technology provides a physical way to permit one-way communication from a high-security network, such as a process automation system network, to a low-security network, such as a company wide area network. In a network design that incorporates data diode technology, a data diode unit can include multiple data diodes, in some circumstances. The data diode unit can be designed in such a way that hardware MAC addresses and IP information are not used to transfer data between the networks. Data diode technology can be hosted in two hardened gateway servers, with proprietary data diode cards placed in each server. That is, one server can have a "send" card, and the other can have a "receive" card. For example, a high-security network can have a "send" card, and a low-security network can have a "receive" card. Use of data diode technology can isolate both networks electrically and eliminate TCP/IP communication between the two or more networks.

Figure 14B:
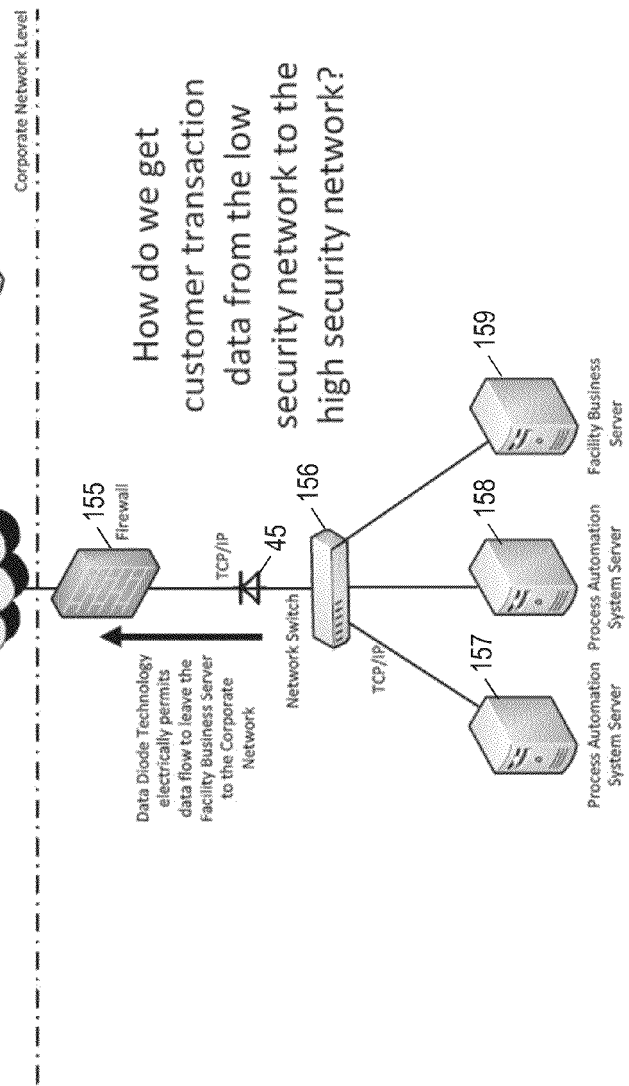
FIG. 14b is a schematic diagram of a system to transfer data between two or more networks configured to have different levels of network protection according to an embodiment of the invention.

Data diodes, such as those manufactured by Owl Computing Technologies, Nexor, Waterfall Security Solutions, or Fox IT, can be unidirectional gateways that allow communication solely in one direction without any opportunity for communication in the other direction, as will be understood by those skilled in the art. That is, a data diode unit 45, as illustrated in FIG. 14*a* and FIG. 14*b*, for example, can transfer data through physical Ethernet media in one direction. For example, a data diode unit 45 can include two hardened servers. A "send" communication card can be installed in one of the servers, and a "receive" communication card can be installed in the other server. An optical link can transmit information, for example, by including a light source at the server with the "send" card and a photo detector at the server with the "receive" card. Consequently, no data can be communicated from the server with the "receive" card to the server with the "send" card. A data diode can therefore prevent transmission by IP communication, for example, between the two servers. A data diode unit 45 can include one or more data diodes. That is, a data diode unit 45 can include two or more data diodes in a serial arrangement, for example, or two or more servers configured to operate as a data diode.

Even when entities use security measures to insulate high-security networks from vulnerabilities as much as possible, many entities also require a way for a low-security network to communicate with a high-security network. For example, process automation systems frequently require data to flow bidirectionally between low-security networks and the process automation system network. Notably, data diodes permit this type of bidirectional communication when two data diode units are used, e.g., when one data diode unit allows transmission of data from a high-security network to a low-security network and the other data diode unit allows transmission from the low-security network to the high-security network. Bidirectional communication, however, exposes the process automation system network to vulnerabilities. To reduce the risk of this vulnerability, entities can use one-way data diode units to protect the process automation system network. Although data transfer can remain bidirectional between, for instance, two computers on a low-security network—and between two other computers on a high-security network, for example—data transfer can be unidirectional from a computer on the high-security network to a computer on the low-security network. That is, data can be transferred from a high-security network to one or more low-security networks by use of a one-way data diode unit. Data, however, cannot be transferred from the low-security networks to the high-security network.

An entity can safeguard some information or a network by using an arrangement including a firewall 155, a one-way data diode unit 45, and a network switch 156, for example, as illustrated in FIG. 14*a*. An embodiment can advantageously isolate a plant network, such as a process automation system network, for example, from a corporate business network while retaining an ability to securely pass transactional data from the process automation system network to the corporate business network or another lower security network. Data can be transmitted from a process automation server A 157 to the plant IT network 153, as illustrated in FIG. 14*a* and FIG. 14*b*, for example, because the data diode unit 45 can electrically permit data to flow in this direction. Data can then be transmitted to a company wide area network 151, for example, if desired.

Figure 1:
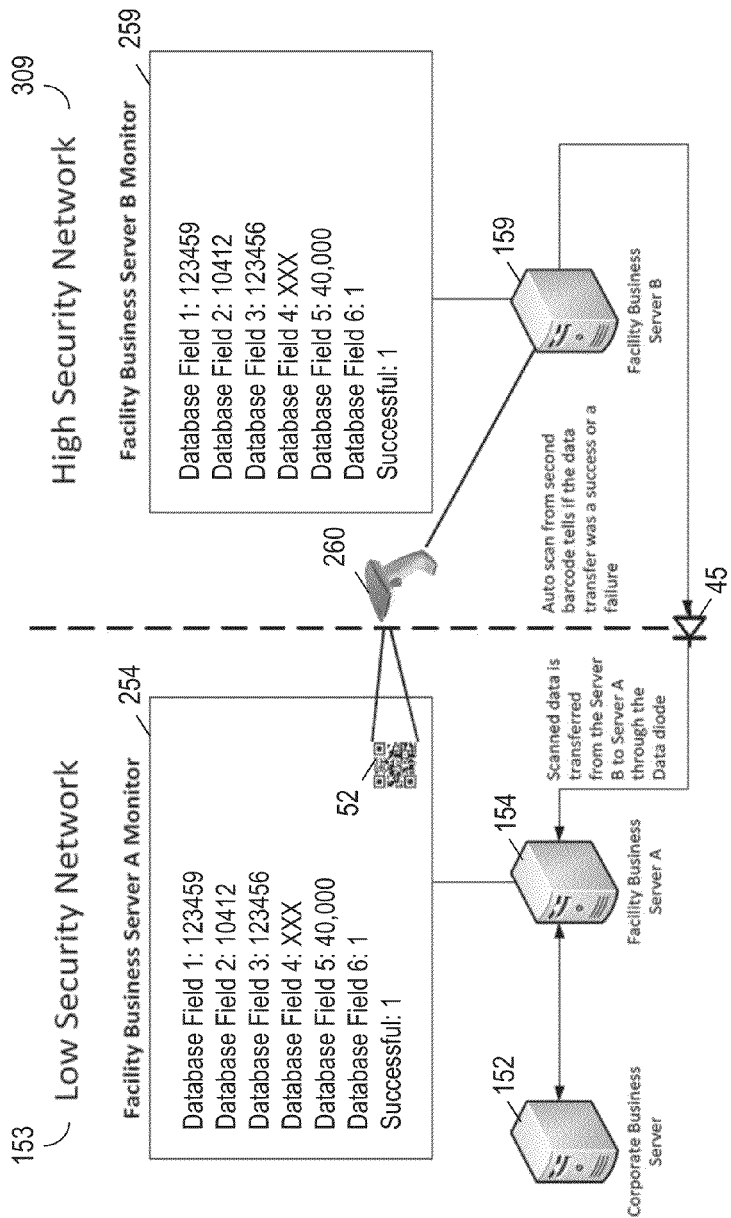
FIG. 1 is a schematic diagram of a system to transfer data between two or more networks configured to have different levels of network protection according to an embodiment of the invention.
Figure 2:
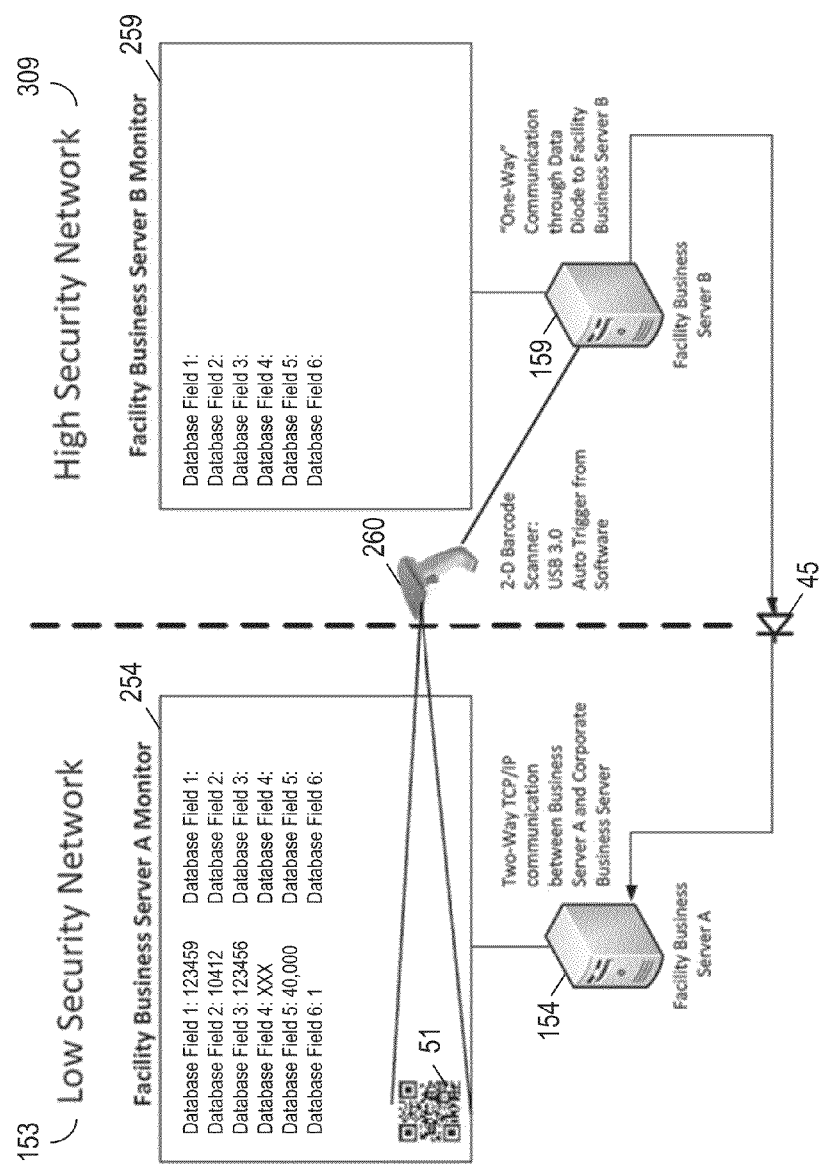
FIG. 2 is a schematic diagram of a system to transfer data between two or more networks configured to have different levels of network protection according to an embodiment of the invention.
Figure 4:
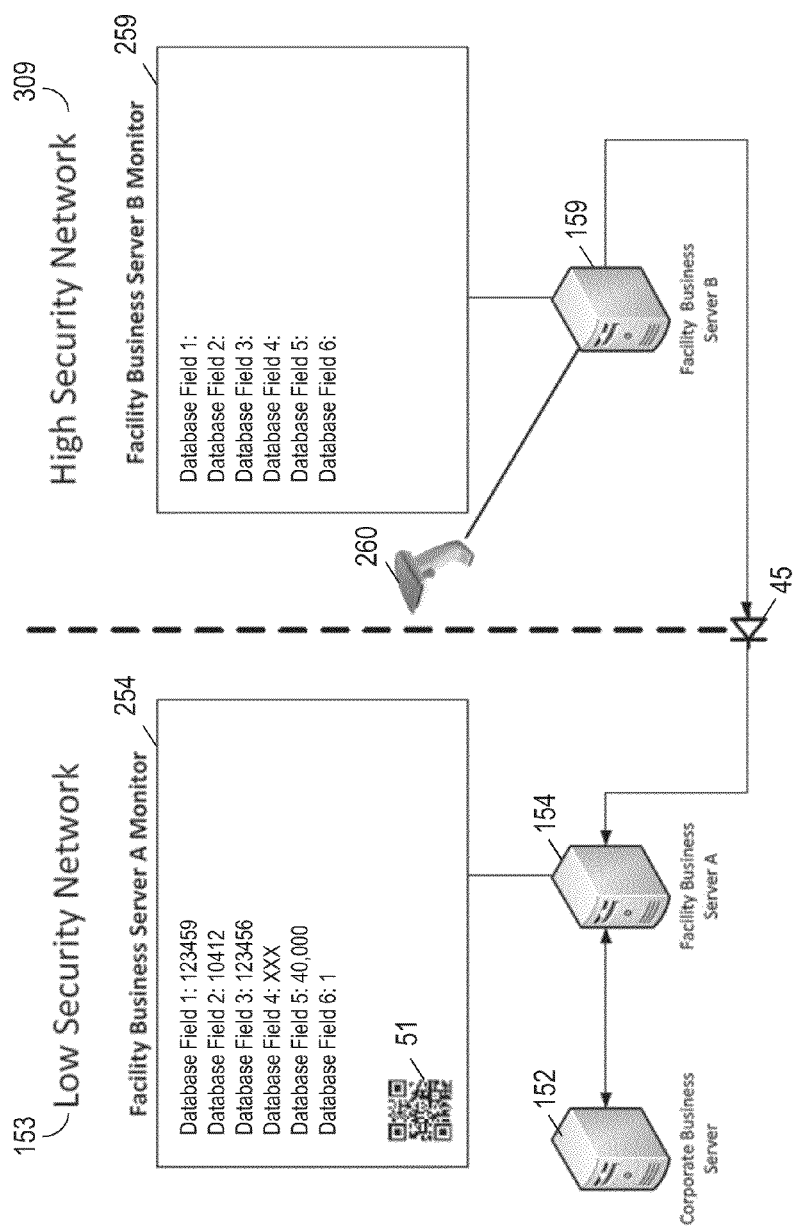
FIG. 4 is a schematic diagram of a system to transfer data between two or more networks configured to have different levels of network protection according to an embodiment of the invention.
Figure 5:
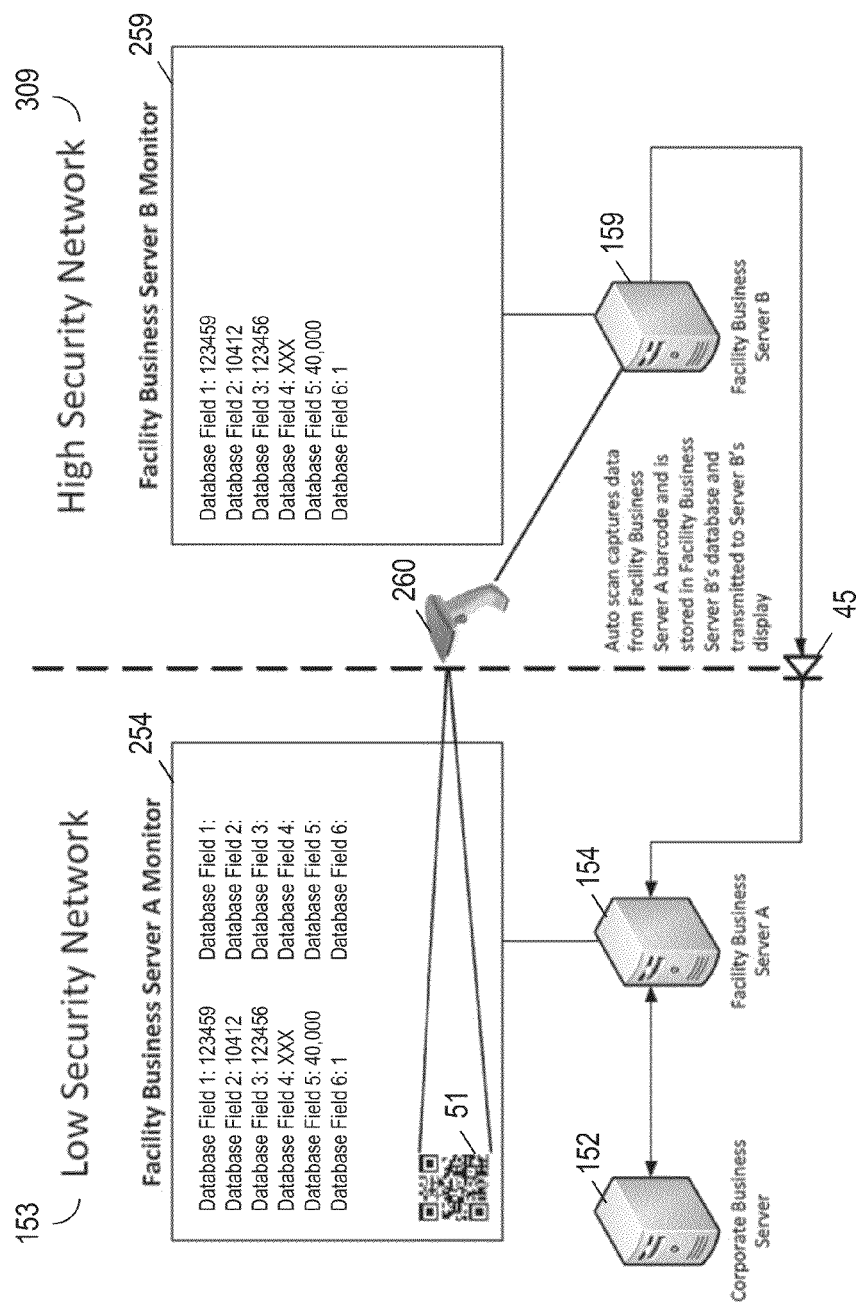
FIG. 5 is a schematic diagram of a system to transfer data between two or more networks configured to have different levels of network protection according to an embodiment of the invention.

As an example, facility business server A 154 can be a first computer 30, according to an embodiment, and facility business server B 159 can be a second computer 10, as illustrated, for example, in FIG. 14*a*, FIG. 1, and FIG. 2. That is, a plant IT network 153 can be a first network 3, and a process automation system network 309 can be a second network 1, for example. As a result, data transferred from facility business server A 154 to facility business server B 159 can be transferred from a low-security network to a high-security network, for example, as depicted in FIG. 14*a* and FIG. 1. In this example, transactional data can be transferred from corporate business server 152 to facility business server A 154 using TCP/IP communication, as illustrated, for example, in FIG. 2 and FIG. 3. Facility business server A 154 can then generate data barcodes 51 and can display the information, i.e., representations of contents of the transactional data, on a display 254 for an operator's viewing and inspection, as illustrated, for example, in FIG. 4. Facility business server B 159 can then use a barcode scanning device 260—automatically triggered by generation of the data barcodes 51 on the display 254 of facility business server A 154, for example—to scan the display 254, as illustrated, for example, in FIG. 5. Facility business server B 159 can then store decoded contents of the transactional data in a database to capture contents of the transactional data from facility business server A 154. Facility business server B 159 can also optionally display representations of decoded contents of the transactional data received on a display 259, as illustrated in FIG. 5, for example. Facility business server B 159 can then transmit decoded contents of the transactional data as received to facility business server A 154 through a data diode unit 45 for validation, as illustrated, for example, in FIG. 6. For example, facility business server B 159 can transmit decoded contents of the transactional data as received to a "send" server of the data diode unit 45 using TCP/IP communication. The "send" server can then transmit decoded contents of the transactional data to a "receive" server using an optical link. In this way, facility business server A 154 can determine whether facility business server B 159 correctly received all contents of the transactional data that was intended to be transmitted or whether an error occurred in transmission. Facility business server A 154 can then store the validation data in a temporary database and compare the data received to the data as sent. Facility business server A 154 can then write a one or zero value in its database field to indicate whether the transmission was successful. Facility business server A 154 can then generate one or more new barcodes—verification barcodes 52—to indicate whether the transmission was successful or unsuccessful, as illustrated, for example, in FIG. 6. Facility business server A 154 can also put unsuccessful transfers, i.e., contents of the transactional data, in a queue for reprocessing. A barcode scanning device 260 of facility business server B 159 can be automatically triggered to scan the display 254 of facility business server A 154, responsive to generation of one or more barcodes on the display 254. Alternatively, the barcode scanning device 260 can be manually or periodically triggered. Advantageously, an embodiment can thus allow for both manual and automatic movement of transactional data between two or more networks. For example, an operator can have an opportunity to inspect an attempted data transfer before determining whether to initiate a barcode scanning process. Facility business server B 159 can then store an indicator of whether transmission was successful, e.g., a one or a zero, in a temporary database. Facility business server B 159 can then store decoded contents of the transactional data associated with a successful transmission in a permanent database and discard decoded contents of the transactional data associated with unsuccessful transfers. The display 254 of facility business server A 154 can then be cleared in preparation for another transmission or cycle.

Advantageously, as illustrated by this example, an embodiment can thus allow contents of transactional data to be securely communicated from a low-security network—such as the plant IT network 153—to a high-security network—such as the process automation system network 309—while having the protection of the data diode unit 45. That is, contents of transactional data can be transmitted from facility business server B 159 to facility business server A 154 through the data diode unit 45. An embodiment can therefore eliminate a need for two-way TCP/IP communication between low-security networks and high-security networks.

An embodiment thus can advantageously be used, for example, to transfer contents of transactional data—e.g., laboratory data or business transaction data—from a low-security network to a high-security network. Other examples of transactional data can include, for example, automation systems data, hospital data, and bank data. In some circumstances, a single barcode can be sufficient to transfer contents of the target data, such as transactional data. For example, a QR Code can store approximately 3.7 MB of data, which can be sufficient to transfer some types of transactional data. Further, an embodiment can also allow for contents of transactional data to be transferred from facility business server B 159 to facility business server A 154—that is, from a high-security network to a low-security network. As illustrated in FIG. 14a, for example, contents of transactional data can be transferred from a process automation server A 157 or process automation server B 158 to facility business server B 159 via two-way TCP/IP communication. Facility business server B 159 can then transmit contents of the transactional data to facility business server A 154 through the data diode. Facility business server A 154 can then store contents of the transactional data in its database and can further transmit contents of the transactional data to corporate business server 152, for example.

An embodiment can thus eliminate any need for two-way TCP/IP communication between two or more networks in some circumstances. Furthermore, an embodiment can minimize the risk of remote unauthorized entry to a high-security network and minimize the risk of a remote computer virus infection of a high-security network. An embodiment can also increase the reliability of data transfer between the two or more networks, reduce overall maintenance costs, and minimize hardware and software requirements.

For example, in some circumstances, two-dimensional or QR Code barcode scanning technology can be used with one-way data diode technology to transfer transactional data between a low-security network (LSN) and a high-security network (HSN) for business and operational transactions on a one-to-one basis. An HSN can be a critical network, such as a process automation system (PAS) network, that requires implementation of maximum security measures to ensure business continuity. A corporate business network (CBN) can be considered an LSN because the criticality of a data loss would have a smaller impact on company business when compared to the HSN. Transfer of data according to an embodiment of the invention can minimize the risk of a cyber-security incident by eliminating transfer of data from the LSN to the HSN via traditional networking methods. For example, an embodiment can be used to transfer transactional data between two physically isolated networks utilizing two-dimensional or QR Code barcode scanning technology and communication from an HSN to an LSN through one-way data diode technologies. An embodiment can be particularly useful, for example, to secure downstream facilities that require bidirectional data transfer. Advantageously, an embodiment can benefit businesses or other entities by installing one-way data diode technology to isolated PAS networks from the CBN while still retaining the ability to securely pass transactional data from the HSN to the LSN. Further, an embodiment can eliminate the requirement to have two-way TCP/IP technology to transfer data between an HSN and an LSN. Additional benefits can include minimizing the risk of remote unauthorized entry to an HSN, minimizing the risk of remote computer virus infection of an HSN, increasing reliability, reducing overall maintenance costs, and minimizing required hardware and software. An embodiment can thus maximize the security of an HSN.

An example of an embodiment is illustrated, for instance, in FIGS. 1-6. An embodiment can include two hardened servers with one or more flat panel screens, such as, for example, facility business server A 154 and facility business server B 159, as illustrated in FIG. 1, for example. Facility business server A 154, which is located on the LSN 153, can have two-way communications with the corporate business server 152 on a CBN, such as a company wide area network 151, as illustrated, for example in FIG. 2 and FIG. 3. Facility business server A 154 can be located at an operating facility in the same physical room as facility business server B 159. Additionally, facility business server A 154 can be connected to a plant business network (PBN), such as, for example, a plant IT network 153. Facility business server B 159 can be connected to a data diode unit 45 to allow transfer of data from the HSN 309 to the LSN 153. Data can flow from facility business server B 159 to facility business server A 154 via two-dimensional/QR Code barcode scanning technology. Facility business server B 159 can have an associated two-dimensional/QR Code barcode reader 260 pointed toward the screen 254 of facility business server A 154. Facility business server A 154 can have customized software developed to generate barcodes, as illustrated, for example, in FIG. 1 and FIG. 2. The barcode scanner 260 of facility business server B 159 can be used to obtain barcode data and populate its database. The two-dimensional/QR Code barcode scanner 260 of facility business server B 159 can have customized software to receive the data sent to facility business server B 159 to thereby determine if scans were successful or a rescan of any barcode is required. A transmission service can be written to send the received data from facility business server B 159 through TCP/IP to the data diode unit 45, where the raw data can be sent electrically one way through the data diode unit 45 to facility business server A 154, as illustrated, for example, in FIG. 6. Facility business server A 154 software can propagate a verification table in a database to compare the data received from the corporate business server 152 and the data received from facility business server B 159 and thereby determine if the data was received accurately on facility business server B 159. Once this comparison is completed, facility business server A 154 can generate a two-dimensional/QR Code barcode 52 that communicates successful transfer of the data, as illustrated, for example, in FIG. 6. Facility business server B 159 can then store the received data and be able to prepare for another transaction. Facility business server B 159 can have custom software to provide an ability to generate manual orders as well as to manually perform the automated process to scan data from facility business server A 154.

Figure 3:
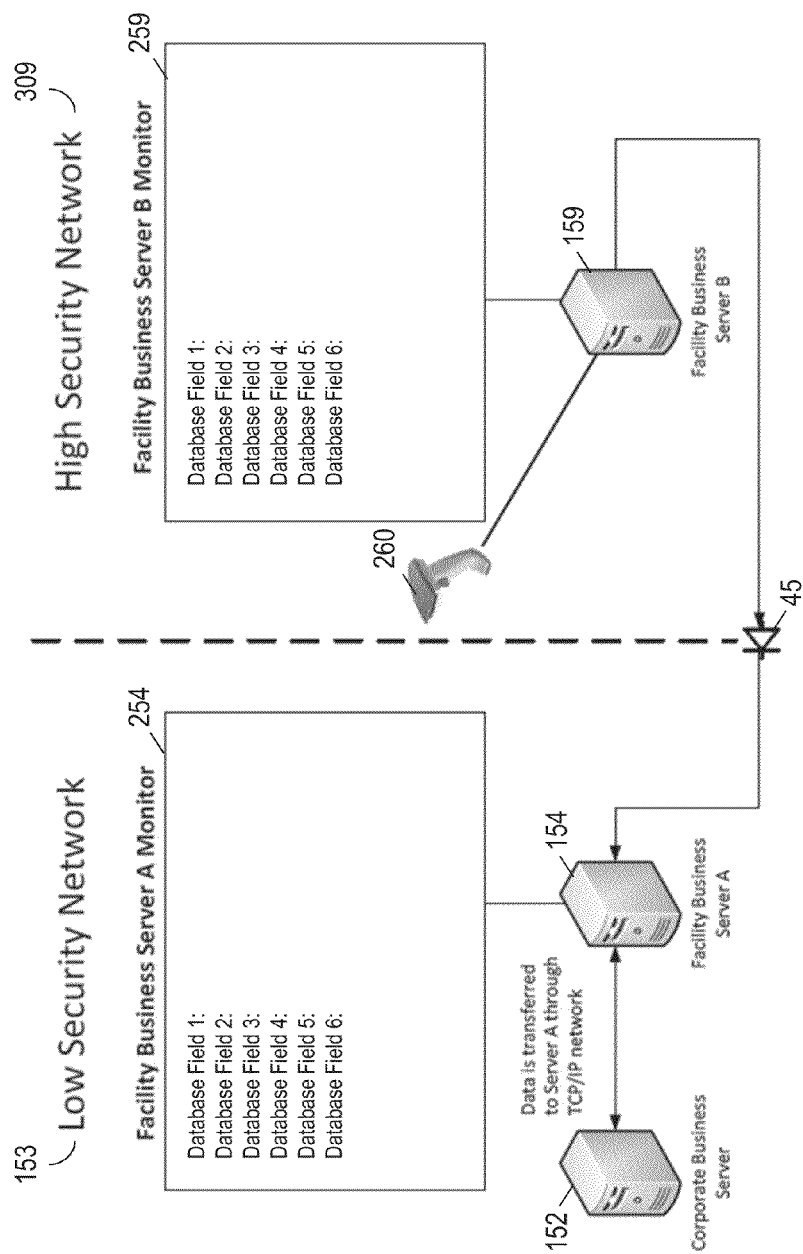
FIG. 3 is a schematic diagram of a system to transfer data between two or more networks configured to have different levels of network protection according to an embodiment of the invention.

In some circumstances, as illustrated in FIG. 3, for example, facility business server A 154 can be a first computer 30, and facility business server B 159 can be a second computer 10. Facility business server A 154 can generate a barcode 51 and display representations of contents of transactional data on its monitor 254 when contents of the transactional data are received from the CBN, e.g., from corporate business server 152, as illustrated, for example, in FIG. 4. Empty fields for each type of transactional data can be displayed on the monitor 259 of facility business server B 159, for example. Facility business server A 154 can then generate a two-dimensional/QR Code barcode 51 based on contents of the transactional data received. The two-dimensional/QR Code barcode scanner 260 of facility business server B 159 can scan the screen 254 of facility business server A 154, which can have a two-dimensional/QR Code barcode 51 displayed that can represent contents of the transactional data displayed on the screen 254. Custom software developed and installed on facility business server B 159 can identify when a barcode is present for auto scanning purposes, as illustrated, for example, in FIG. 2. Facility business server B 159 can display representations of decoded contents of the transactional data on the screen 259 based on decoded contents of the transactional data as received, as illustrated, for example, in FIG. 5. Facility business server B 159 can then transmit decoded contents of the transactional data through TCP/IP to the data diode server which can then securely transmit the raw data out of the HSN 309 to facility business server A 154. Representations of the information received on facility business server A 154 can then be displayed on the monitor 254 next to representations of contents of the transactional data as sent, as illustrated, for example, in FIG. 6. Facility business server A 154 can display new barcodes 52 for facility business server B 159 to scan. If there has been a successful transfer, barcodes 52 can be encoded as a "1" for a successful transfer, for example; a "0" can be used for an unsuccessful transfer. If the transaction is successful, then facility business server A 154 can write a one or zero value in a database field to indicate successful or unsuccessful data transfer, respectively, and can generate confirmation barcodes 52 for facility business server B 159 to scan. Facility business server B can then store successful data transfers and discard unsuccessful data transfers. Facility business server A 154 and facility business server B 159 can then clear their screens 254 and 259 and reset for a next transaction. Operations personnel can have the capability to manually enter data on facility business server B 159 or to manually utilize the barcode scanner 260 to go through the above-mentioned process through on-screen pushbuttons.

Figure 6:
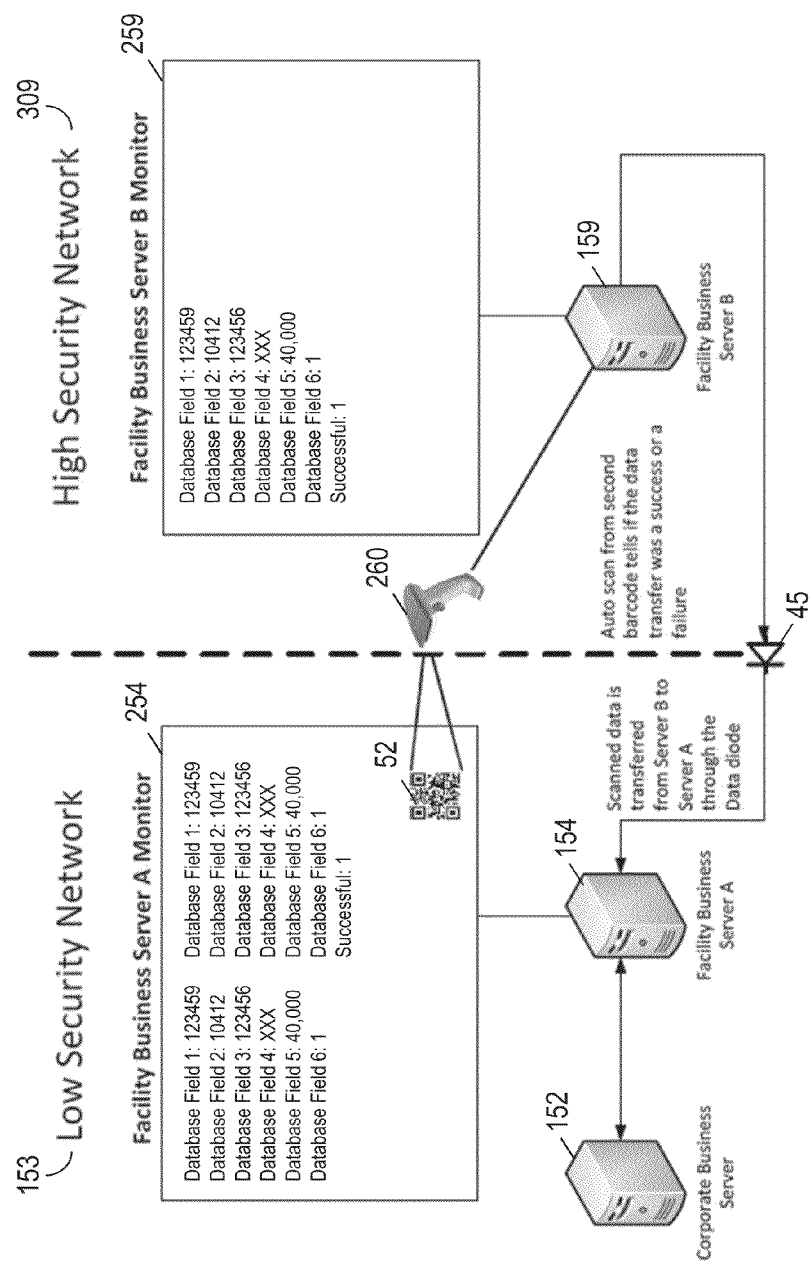
FIG. 6 is a schematic diagram of a system to transfer data between two or more networks configured to have different levels of network protection according to an embodiment of the invention.
Figure 7:
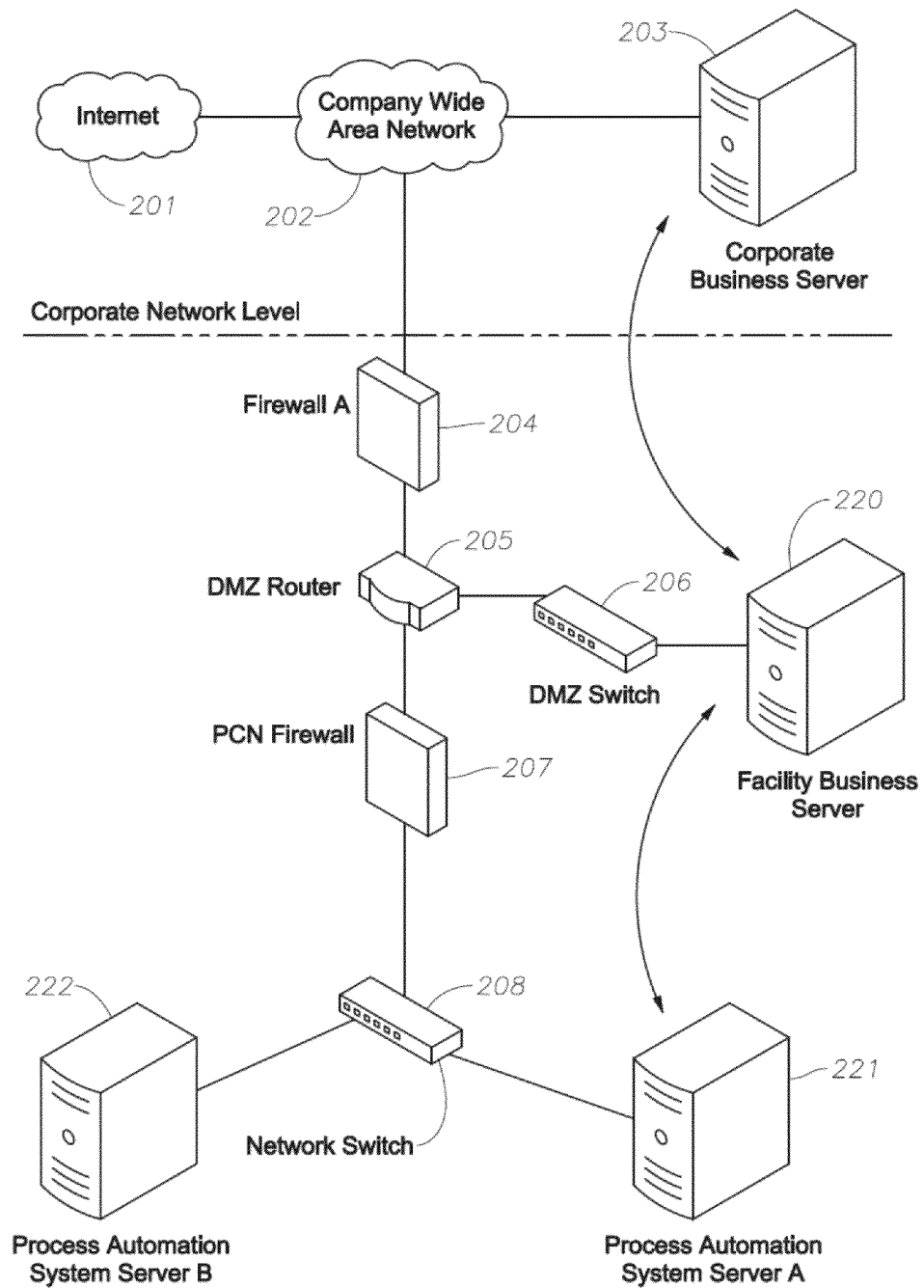
FIG. 7 is a schematic diagram of a system including a demilitarized zone (DMZ), according to the prior art.

More specifically, in some examples of an embodiment, contents of transactional data can be transferred from facility business server A 154 to facility business server B 159, as illustrated, for example, in FIG. 1. For instance, contents of transactional data can be transferred from a corporate business server 152 to facility business server A 154 via two-way TCP/IP communication, as illustrated in FIG. 3, for example. Facility business server A 154 can then generate a barcode 51 and display the information, i.e., representations of contents of the transactional data, on a screen 254 for operator view, as illustrated, for example, in FIG. 4. A two-dimensional/QR Code barcode scanner 260 of facility business server B 159 can be auto triggered by software to scan a screen 254 of facility business server A 154, as illustrated, for example, in FIG. 5. Facility business server B 159 can store decoded contents of the transactional data in its database to thereby capture contents of the transactional data from facility business server A 154. Facility business server B 159 can also display the received information, i.e., decoded contents of the transactional data, on the screen 259 for an operator's view, as illustrated in FIG. 5, for instance. Facility business server B 159 can then transmit the received contents of the transactional data to facility business server A 154 via a data diode unit 45 for verification, as illustrated in FIG. 6, for example. Facility business server A 154 can then store the validation data in a temporary database. In addition, facility business server A 154 can compare contents of the transactional data sent to and received from facility business server B 159. Facility business server A 154 can also write a one or zero value in its database field to indicate successful or unsuccessful data transfer. Then, facility business server A 154 can display a new barcode 52 for successful/unsuccessful transaction, as illustrated in FIG. 6, for example. Facility business server A can also put an unsuccessful transfer in its queue for reprocessing. The barcode scanner 260 of facility business server B 159 can be auto triggered to scan the generated on-screen barcode 52 of facility business server A 154. Additionally, facility business server B 159 can store successful/unsuccessful, i.e., "1" and "0," data into a temporary database. Facility business server B 159 can then store a successful transfer, i.e., the decoded contents of the transactional data, in its permanent database. Facility business server B 159 can also discard unsuccessful transfers. The screens 254 and 259 of facility business server A 154 and facility business server B 159 can then be cleared for a next cycle.

In addition, in some examples of an embodiment, contents of transactional data can be transferred from facility business server B 159 to facility business server A 154. For example, contents of transactional data can be transferred from a process automation system server, such as process automation system server 157 or process automation system server 158, to facility business server B 159 via two-way TCP/IP communication. Facility business server B 159 can then transmit contents of the transactional data to facility business server A 154 through a data diode unit 45. Facility business server A 154 can store contents of the transactional data in its database then transmit contents of the transactional data to corporate business server 152, for example.

A setup process to enable use of an embodiment of the invention can include, for example: (a) purchasing two servers; (b) purchasing a two-dimensional/QR Code barcode scanner; (c) purchasing a single data diode device; (d) purchasing firewalls and other relevant network equipment; (e) developing software to convert database fields to a two-dimensional/QR Code barcode; (f) developing software to automatically scan for a barcode on an LSN facility business server screen and store it on an HSN facility business server; (g) developing software to send data from the facility business server on the HSN to the facility business server on the LSN for verification (refer to item (a) above); (h) generating a new barcode on a facility server located on the LSN; (i) developing software for the facility business server on the HSN to scan a confirmation barcode on the facility business server located on the LSN to confirm that data was transferred successfully; and (j) developing software to begin a new transaction.

Figure 15:
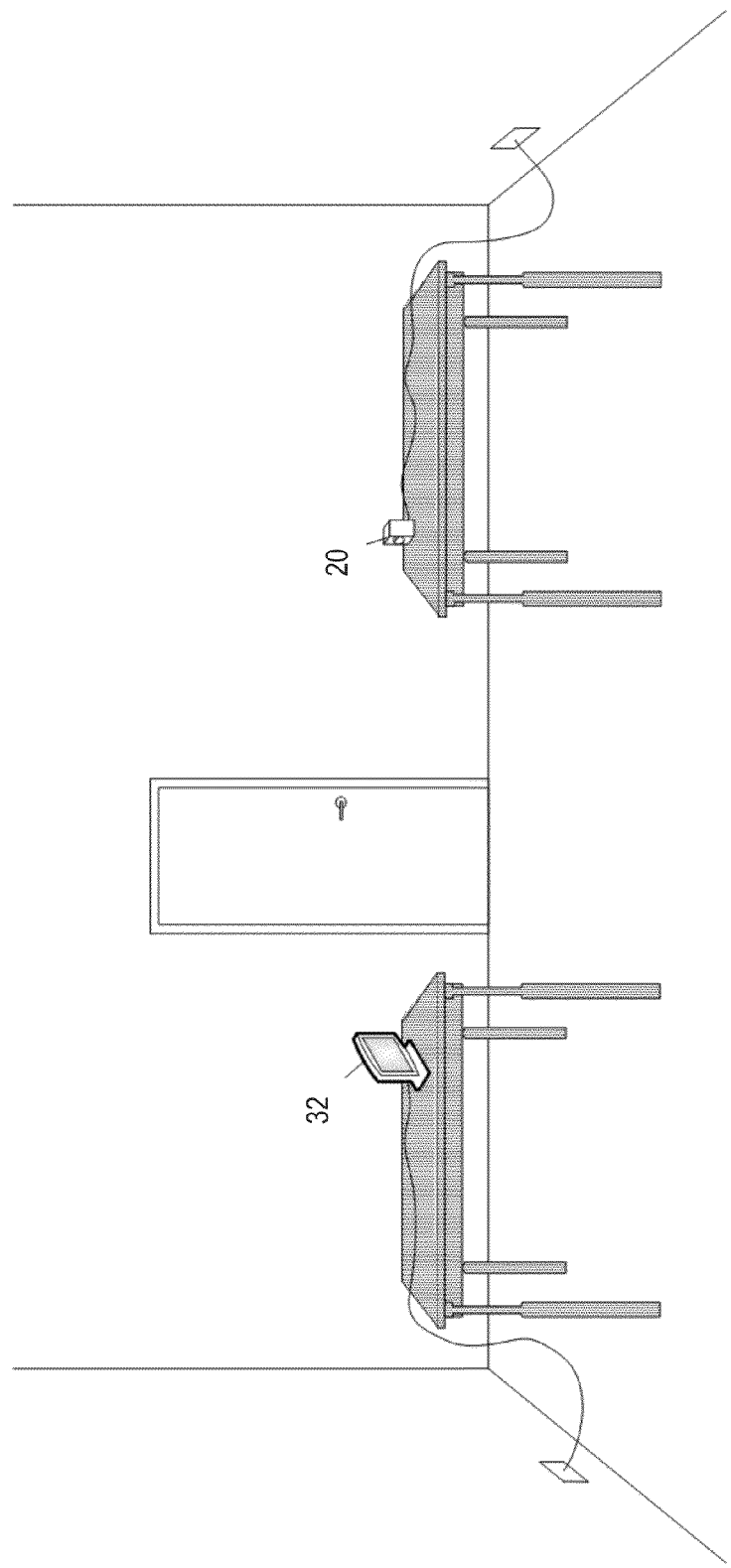
FIG. 15 is an environmental view of a physically secured room containing a system to transfer data between two or more networks configured to have different levels of network protection according to an embodiment of the invention.
Figure 16:
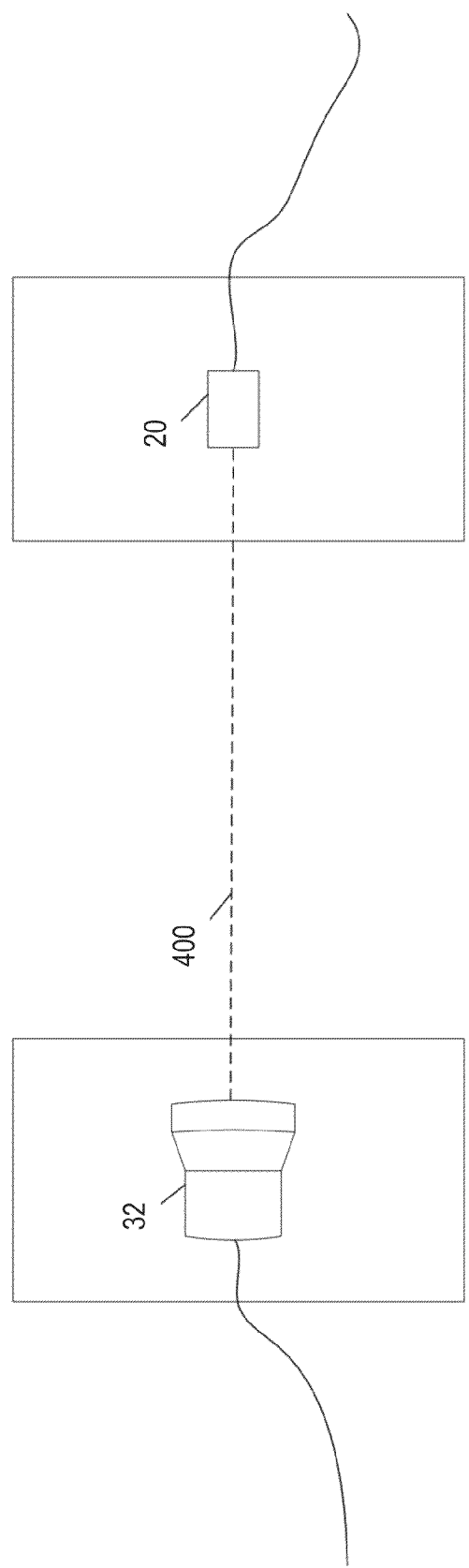
FIG. 16 is an environmental view of a physically secured room containing a system to transfer data between two or more networks configured to have different levels of network protection according to an embodiment of the invention.

An embodiment can thus eliminate the requirement for two-way TCP/IP communication between HSNs and LSNs. An embodiment can advantageously utilize on-screen two-dimensional/QR Code barcoding and "one-way" data diode technology to transfer data between an HSN and an LSN and thereby maximize the security of an HSN, such as a PAS network, while minimizing the risk of an unauthorized access or virus infection from a remotely connected network. An embodiment can further be associated with use of a physically secured room (sometimes described as a "clean room"). That is, an embodiment can be utilized in facilities that have restricted-access rooms that are locked and secure to house, for example, servers associated with a high-security network. Persons with restricted access can, in some circumstances, perform data transfers between a high-security network and a low-security network within a physically secured room according to embodiments of the invention. Those authorized persons can include, for example, engineers or operations personnel. Anyone entering the room can be required to check any removable media or other items before entering the room. An embodiment can enable a control engineer, for example, to be frisked prior to entering a control room associated with the high-security network to perform the engineer's maintenance duties related to the network. An entity could choose to establish a physically secured room to minimize the risk of unauthorized data removal from—or unauthorized additions or changes to—a network by use of removable media. Consequently, use of a physically secured room in conjunction with an embodiment of the invention can further minimize the vulnerability of a high-security network while still allowing bidirectional data transmission. For example, a physically secured room can contain one or more displays 32 of a first computer 30 and one or more barcode scanning devices 20 in communication with the second computer 10, as illustrated in FIG. 15, for example. The one or more barcode scanning devices 20 in communication with the second computer 10 can be positioned so as to establish a line of sight 400 that includes one or more of the one or more displays 32 of the first computer 30. The one or more displays 32 and the one or more barcode scanning devices 20 can be stationary and fixed so as to ensure that line of sight 400 remains unimpeded to allow data transmission according to embodiments of the invention, as illustrated in FIG. 16, for example. Consequently, in such circumstances, contents of transactional data can be transmitted between the first network 3 and the second network 1 without any need for user review or approval of transactional data to be transferred after a data transfer process has been initiated. A user or other person can, however, also manually initiate, approve, or supervise data transfers from within the physically secured room.

More generally, an embodiment of the invention can include, for example computer-implemented methods to transfer data between two or more networks having different levels of network protection. Data to be transferred can be one or more types of digitally stored information, including, for example, data files, transactional database records, transactional data, and data backup files. A method according to an embodiment can include generating one or more data barcodes 51 on a display 32 of a first computer 30 in communication with and positioned within a first network 3, as illustrated in FIG. 12a, for example. The one or more data barcodes 51 can be configured to encode one or more pieces of digitally stored information positioned in the first network 3. For example, a data barcode 51 can encode pieces of digitally stored information including transactional data, such as information illustrated on the display 32 along with the data barcode 51. For example, the one or more pieces of digitally stored information can encode a set of data including a plurality of database field data of any database field types used for transactional data, such as numeric and text data. For instance, the one or more pieces of digitally stored information can encode a set of data including data in Database Fields 1-6, as illustrated in FIG. 12a, for example. An exemplary set of data in Database Fields 1-6, as depicted, can include one or more values in each database field. For example, Database Field 1 can have a value of 123459, Database Field 2 can have a value of 10412, Database Field 3 can have a value of 123456, Database Field 4 can have a value of XXX, Database Field 5 can have a value of 40,000, and Database Field 6 can have a value of 1. As another example, the one or more pieces of digitally stored information can encode a set of data relating to a product order and including, for instance, a customer order number, a driver identification number, a customer number, a product identifier, a measure of quantity, and a measure of units. That is, in such an example, Database Field 1 can relate to customer order number, Database Field 2 can relate to driver identification number, Database Field 3 can relate to customer identifiers, Database Field 4 can relate to product identifiers, Database Field 5 can relate measures of quantity, and Database Field 6 can relate to measures of units, for example. Furthermore, more than one data barcode 51 can encode pieces of digitally stored information, for example. A method can further include decoding the one or more data barcodes 51 responsive to scanning the display 32 by use of one or more barcode scanning devices 20 in communication with a second computer 10, as illustrated in FIG. 12a. The second computer 10 can be positioned remote from the first computer 30 and in communication with and positioned within a second network 1, as illustrated in FIG. 13, for example. The second network 1 can have a different level of network security protection than the first network 3 and be configured for only one-way secure communication from the second network 1 to the first network 3. A method can also include transferring the one or more decoded pieces of digitally stored information to temporary storage associated with the second network 1. For example, after scanning the display 32 by use of a barcode scanning device 20, as illustrated in FIG. 12a, for example, the one or more data barcodes 51 can be decoded, as illustrated in FIG. 12a, for example, and the one or more decoded pieces of digitally stored information can be transferred to temporary storage associated with the second network 1. For example, information related to the data from Database Fields 1-6 that is encoded in a data barcode 51 can be decoded and transferred to temporary storage. The information can also be displayed on a display 12 of the second computer 10, as illustrated in FIG. 12b, for example. A method can further include securely communicating copies of the one or more decoded pieces of digitally stored information in one-way direction from the second computer 10 to the first computer 30.

A method can also include generating—responsive to comparison of the securely communicated copies of the one or more decoded pieces of digitally stored information and the one or more pieces of digitally stored information positioned in the first network 3—one or more verification barcodes 52 on the display 32 of the first computer 30, as illustrated in FIG. 12d, for example. Comparison of the securely communicated copies of the one or more decoded pieces of digitally stored information and the one or more pieces of digitally stored information positioned in the first network 3 can include comparison by use of a verification table in a database, for example. The one or more verification barcodes 52 can be configured to encode one or more verification files to indicate success of a data transmission from the first network 3 to the second network 1. For example, as illustrated in FIG. 12d, a verification barcode 52 can encode one or more verification files indicating a successful transmission, and the display 32 of the first computer 30 can display text indicating successful transmission, as illustrated in FIG. 12c, for example. A method can further include decoding—responsive to scanning the display 32 of the first computer 30 by use of the one or more barcode scanning devices 20 in communication with the second computer 10—the one or more verification barcodes 52. Decoding the one or more verification barcodes 52 can thereby confirm success of a data transmission from the first network 3 to the second network 1, as illustrated, for example, in FIG. 12e. After decoding the one or more verification barcodes 52, a display 12 of the second computer 10 can display the same information (e.g., as depicted in FIG. 12e, for example, that Database Field 1 has a value of 123459, Database Field 2 has a value of 10412, Database Field 3 has a value of 123456, Database Field 4 has a value of XXX, Database Field 5 has a value of 40,000, Database Field 6 has a value of 1, and that transmission was successful), including successfulness of data transmission, as the display 32 of the first computer 30, as illustrated, for example, in FIG. 12e. As illustrated in FIG. 12e, for example, successfulness of data transmission can be indicated by, for example, a numeral "one" for successful and a numeral "zero" for unsuccessful. A method can also include storing, responsive to an indication in the one or more verification files of successful data transmission of the one or more pieces of digitally stored information, the one or more pieces of digitally stored information in permanent storage associated with the second network 1. A method according to an embodiment can further include discarding the one or more pieces of digitally stored information in temporary storage associated with the second network 1, responsive to an indication in the one or more verification files of unsuccessful data transmission of the one or more pieces of digitally stored information. Additionally, decoding the one or more data barcodes 51 according to an embodiment can include disregarding error-correction capabilities of the one or more data barcodes 51.

In some methods to transfer data between two or more networks having different levels of network protection according to an embodiment of the invention, a method can include decoding one or more data barcodes 51. Decoding the one or more data barcodes 51 can be responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding the one or more data barcodes 51 can also produce contents of one or more pieces of digitally stored information represented by the one or more data barcodes 51 and associated with the first network 3. The second network 1 can have a different level of network security protection than the first network 3 and can be configured for only one-way secure communication from the second network 1 to the first network 3. A method can further include securely communicating copies of contents of the one or more decoded pieces of digitally stored information in one-way communication from temporary storage associated with the second network 1 to the first network 3 for comparison to the one or more pieces of digitally stored information associated with the first network 3. Temporary storage associated with the second network 1 can include, for example, temporary storage 16 of the second computer 10, as illustrated, for example, in FIG. 13. A method can further include decoding, responsive to scanning the display 32 of the first computer 30 by use of the one or more barcode scanning devices 20 in communication with the second computer 10, one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. A method can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. More permanent storage associated with the second network 1 can include, for example, permanent storage 17 of the second computer 10, as illustrated, for example, in FIG. 13. Decoding one or more data barcodes 51 according to an embodiment can include disregarding error-correction capabilities of the one or more data barcodes 51. In addition, a method according to an embodiment can further include discarding the one or more decoded pieces of digitally stored information, responsive to an indication from contents of the one or more verification files of unsuccessful data transmission of the one or more pieces of digitally stored information.

In some circumstances, for example, the first network 3 can be a high-security network, and the second network 1 can be a low-security network. In other circumstances, the first network 3 can be a low-security network, and the second network 1 can be a high-security network. As will be understood by those skilled in the art, the one or more data barcodes 51 and the one or more verification barcodes 52 can be one or more of the following: two-dimensional matrix codes, QR Codes, Aztec Codes, and PDF417 codes.

An embodiment of the invention can include or utilize a one-way data diode unit 45, as illustrated, for example, in FIG. 14*a* and FIG. 14*b*. For example, in some methods according to an embodiment of the invention, securely communicating copies of the one or more decoded pieces of digitally stored information, e.g., database records, in one-way direction from the second computer 10 to the first computer 30 can include transmitting copies of the one or more decoded pieces of digitally stored information from the second network 1 to the first network 3 through a one-way data diode unit 45, as illustrated, for example, in FIG. 12. In addition, in some methods, securely communicating copies of contents of the one or more decoded pieces of digitally stored information in one-way communication from temporary storage associated with the second network 1 to the first network 3 can include transmitting copies of contents of the one or more decoded pieces of digitally stored information from the second network 1 to the first network 3 through a one-way data diode unit 45, as illustrated in FIG. 12, for example.

An embodiment can also include systems to transfer data between two or more networks having different levels of network protection. A system according to an embodiment can include a first computer 30 in communication with and positioned within a first network 3. The first computer 30 can include one or more processors 31 and one or more input and output units 33 in communication with the one or more processors 31. The first computer 30 can further include one or more displays 32 in communication with the one or more processors 31 and non-transitory memory medium 34 in communication with the one or more processors 31. For example, the first computer 30 can be a hardened server. The memory medium 34 can include computer-readable instructions stored therein that when executed cause the first computer 30 to perform steps. The computer-readable instructions can include, for example, a computer program 35, as illustrated in FIG. 13, for example. The memory medium 34 can also include temporary storage 36 and permanent storage 37. Steps performed by the first computer 30 can include generating one or more data barcodes 51 on one or more of the one or more displays 32 of the first computer 30. The one or more data barcodes 51 can be configured to encode one or more pieces of digitally stored information positioned in the first network 3. Steps performed by the first computer 30 can further include generating—responsive to comparison of the one or more pieces of digitally stored information positioned in the first network 3 and copies of the one or more pieces of digitally stored information securely communicated from a second network 1—one or more verification barcodes 52 on one or more of the one or more displays 32 of the first computer 30. The one or more verification barcodes 52 can be configured to encode one or more verification files to indicate success of a data transmission from the first network 3 to the second network 1. A system can further include a second computer 10 positioned remote from the first computer 30 and in communication with and positioned within the second network 1. The second network 1 can have temporary storage and separate permanent storage associated therewith. For example, temporary storage associated with the second network 1 can include temporary storage 16 of the second computer 10, for example, as illustrated in FIG. 13. Permanent storage associated with the second network 1 can include permanent storage 17 of the second computer 10, for example. The second network 1 can have a different level of network security protection than the first network 3 and can be configured for only one-way secure communication from the second network 1 to the first network 3. The second computer 10 can include one or more processors 11 and one or more input and output units 13 in communication with the one or more processors 11 of the second computer 10. The second computer 10 can further include one or more barcode scanning devices 20 in communication with the one or more processors 11 of the second computer 10 and positioned to enable scanning of the one or more displays 32 of the first computer 30. The second computer 10 can also include non-transitory memory medium 14 in communication with the one or more processors 11 of the second computer 10. For example, the second computer 10 can be a hardened server. The memory medium 14 can include computer-readable instructions stored therein that when executed cause the second computer 10 to perform steps.

Steps performed by the second computer 10 can include decoding the one or more data barcodes 51, responsive to scanning the one or more of the one or more displays 32 of the first computer 30 by use of the one or more barcode scanning devices 20. Scanning the one or more of the one or more displays 32 according to an embodiment can be automatically triggered by generation of one or more data barcodes 51 on one or more of the one or more displays 32. Steps performed by the second computer 10 can further include transferring the one or more decoded pieces of digitally stored information to the temporary storage associated with the second network 1. Steps performed by the second computer 10 can also include securely communicating copies of the one or more decoded pieces of digitally stored information in one-way direction from the second computer 10 to the first computer 30. Steps performed by the second computer 10 can then include decoding, responsive to scanning the one or more of the one or more displays 32 of the first computer 30 by use of the one or more barcode scanning devices 20, the one or more verification barcodes 52. Decoding the one or more verification barcodes 52 can thereby confirm success of a data transmission from the first network 3 to the second network 1. Steps performed by the second computer 10 can further include storing the one or more pieces of digitally stored information in the permanent storage associated with the second network 1, responsive to an indication in the one or more verification files of successful data transmission of the one or more pieces of digitally stored information. Further, one or more of the one or more displays 32 can be cleared after steps have been performed, for example. In addition, the memory medium 14 of the second computer 10 can further include computer-readable instructions stored therein that when executed cause the second computer 10 to perform the step of discarding the one or more pieces of digitally stored information in the temporary storage associated with the second network 1, responsive to an indication in the one or more verification files of unsuccessful data transmission of the one or more pieces of digitally stored information.

An exchange of information between the first computer 30 and the second computer 10 can thus include transmission of pieces of digitally stored information encoded in data barcodes 51 from the first computer 30 to the second computer 10, transmission of copies of the pieces of digitally stored information from the second computer 10 to the first computer 30, and transmission of verification files from the first computer 30 to the second computer 10, for example.

In some systems to transfer data between two or more networks having different levels of network protection according to an embodiment of the invention, a system can include a first computer 30 in communication with and positioned within a first network 3 and a second computer 10 positioned remote from the first computer 30 and in communication with and positioned within a second network 1. The first computer 30 can include one or more processors 31 and one or more displays 32 in communication with the one or more processors 31. In addition, the second network 1 can have temporary storage and separate more permanent storage associated therewith. For example, temporary storage associated with the second network 1 can include temporary storage 16 of the second computer 10, for example, as illustrated in FIG. 13. Permanent storage associated with the second network 1 can include permanent storage 17 of the second computer 10, for example. The second network 1 can also have a different level of network security protection than the first network 3 and can be configured for only one-way secure communication from the second network 1 to the first network 3. The second computer 10 can include one or more processors 11 and one or more input and output units 13 in communication with the one or more processors 11. The second computer 10 can also include one or more barcode scanning devices 20 in communication with the one or more processors 11 and non-transitory memory medium 14 in communication with the one or more processors 11. The memory medium 14 can include computer-readable instructions stored therein that when executed cause the second computer 10 to perform steps.

Steps performed by the second computer 10 can include decoding one or more data barcodes 51, responsive to scanning from one or more of the one or more displays 32 of the first computer 30 by use of the one or more barcode scanning devices 20. Decoding the one or more data barcodes 51 can produce contents of one or more pieces of digitally stored information represented by the one or more data barcodes 51 and associated with the first network 3. Steps performed by the second computer 10 can further include securely communicating copies of contents of the one or more decoded pieces of digitally stored information in one-way communication from the temporary storage associated with the second network 1 to the first network 3 for comparison to the one or more pieces of digitally stored information associated with the first network 3. Steps performed by the second computer 10 can also include decoding—responsive to scanning one or more of the one or more displays 32 of the first computer 30 by use of the one or more barcode scanning devices 20—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Steps performed by the second computer 10 can further include storing contents of the one or more decoded pieces of digitally stored information in the more permanent storage associated with the second network 1, responsive to an indication from contents of the one or more verification files of successful data transmission of the one or more pieces of digitally stored information associated with the first network 3 to the second network 1. The memory medium 14 can further include computer-readable instructions stored therein that when executed cause the second computer 10 to perform the step of discarding the one or more decoded pieces of digitally stored information, responsive to an indication from contents of the one or more verification files of unsuccessful data transmission of the one or more pieces of digitally stored information.

In some systems to transfer data between two or more networks having different levels of network protection according to an embodiment of the invention, for example, a system can further include a one-way data diode unit 45 in communication with the one or more processors 11 of the second computer 10 and positioned to transmit data to the first network 3, as illustrated in FIG. 13, for example. Furthermore, securely communicating copies of the one or more decoded pieces of digitally stored information in one-way direction from the second computer 10 to the first computer 30 can include transmitting copies of the one or more decoded pieces of digitally stored information from the second network 1 to the first network 3 through the one-way data diode unit 45, for example. Additionally, in some systems according to an embodiment of the invention, a system can further include a one-way data diode unit 45 in communication with the one or more processors 11 and positioned to transmit data to the first network 3. In such systems, securely communicating copies of contents of the one or more decoded pieces of digitally stored information in one-way communication from the temporary storage associated with the second network 1 to the first network 3 can include transmitting copies of contents of the one or more decoded pieces of digitally stored information from the second network 1 to the first network 3 through a one-way data diode unit 45, for example.

An embodiment can also include non-transitory computer-readable medium having one or more computer programs stored therein operable by one or more processors to transfer data between two or more networks having different levels of network protection. The one or more computer programs can include a set of instructions that, when executed by the one or more processors, cause the one or more processors to perform operations. Operations can include generating one or more data barcodes 51 on a display 32 of a first computer 30 in communication with and positioned within a first network 3. The one or more data barcodes 51 can be configured to encode one or more pieces of digitally stored information positioned in the first network 3. Operations can further include decoding the one or more data barcodes 51 responsive to scanning the display 32 by use of one or more barcode scanning devices 20 in communication with a second computer 10. The second computer 10 can be positioned remote from the first computer 30 and in communication with and positioned within a second network 1. The second network 1 can have a different level of network security protection than the first network 3 and can be configured for only one-way secure communication from the second network 1 to the first network 3. Operations can also include transferring the one or more decoded pieces of digitally stored information to temporary storage associated with the second network 1. Operations can further include securely communicating copies of the one or more decoded pieces of digitally stored information in one-way direction from the second computer 10 to the first computer 30. Operations can also include generating one or more verification barcodes 52 on the display 32 of the first computer 30, responsive to comparison of the securely communicated copies of the one or more decoded pieces of digitally stored information and the one or more pieces of digitally stored information positioned in the first network 3. The one or more verification barcodes 52 can be configured to encode one or more verification files to indicate success of a data transmission from the first network 3 to the second network 1. Operations can further include decoding the one or more verification barcodes 52, responsive to scanning the display 32 of the first computer 30 by use of the one or more barcode scanning devices 20 in communication with the second computer 10. Decoding the one or more verification barcodes 52 can thereby confirm success of a data transmission from the first network 3 to the second network 1. Operations can also include storing the one or more pieces of digitally stored information in permanent storage associated with the second network 1, responsive to an indication in the one or more verification files of successful data transmission of the one or more pieces of digitally stored information. The set of instructions, when executed by the one or more processors, can further cause the one or more processors to perform the operation of discarding, responsive to an indication in the one or more verification files of unsuccessful data transmission of the one or more pieces of digitally stored information, the one or more pieces of digitally stored information in temporary storage associated with the second network 1.

An embodiment can also include non-transitory computer-readable medium having one or more computer programs stored therein operable by one or more processors to transfer data between two or more networks having different levels of network protection. For example, the one or more computer programs can include a set of instructions that, when executed by the one or more processors, cause the one or more processors to perform operations. Operations can include decoding one or more data barcodes 51, responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding one or more data barcodes 51 can produce contents of one or more pieces of digitally stored information represented by the one or more data barcodes 51 and associated with the first network 3. The second network 1 can have a different level of network security protection than the first network 3 and be configured for only one-way secure communication from the second network 1 to the first network 3. For example, non-transitory computer-readable medium can be memory 14 of the second computer having one or more computer programs 15 stored therein, as illustrated in FIG. 13, for example. Operations can further include securely communicating copies of contents of the one or more decoded pieces of digitally stored information in one-way communication from temporary storage associated with the second network 1 to the first network 3 for comparison to the one or more pieces of digitally stored information associated with the first network 3. Operations can also include decoding—responsive to scanning the display 32 of the first computer by use of the one or more barcode scanning devices 20 in communication with the second computer 10—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Operations can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. The set of instructions, when executed by the one or more processors, can further cause the one or more processors to perform the operation of discarding the one or more decoded pieces of digitally stored information, responsive to an indication from contents of the one or more verification files of unsuccessful data transmission of the one or more pieces of digitally stored information.

In some non-transitory computer medium having one or more computer programs stored therein according to an embodiment of the invention, securely communicating copies of the one or more decoded pieces of digitally stored information in one-way direction from the second computer 10 to the first computer 30 can include transmitting copies of the one or more decoded pieces of digitally stored information from the second network 1 to the first network 3 through a one-way data diode unit 45. Furthermore, in some non-transitory computer medium having one or more computer programs stored therein according to an embodiment of the invention, securely communicating copies of contents of the one or more decoded pieces of digitally stored information in one-way communication from temporary storage associated with the second network 1 to the first network 3 can include transmitting copies of contents of the one or more decoded pieces of digitally stored information from the second network 1 to the first network 3 through a one-way data diode unit 45.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

The invention claimed is:

1. A computer-implemented method to transfer data between two or more networks configured to have different levels of network protection, the method comprising:
    decoding one or more barcodes indicative of contents of transactional data associated with and positioned within a first network to thereby define one or more data barcodes, responsive to receipt of a scan of a display of a first computer in communication with and positioned within the first network, by use of one or more barcode scanning devices in communication with a second computer positioned remote from the first computer and in communication with and positioned within a second network, to produce contents of the transactional data represented by the one or more data barcodes, the second network configured to have a different level of network security protection than the first network and configured to allow only one-way secure communication from the second network to the first network by use of a data diode unit;
    transmitting decoded contents of the transactional data from the second network to the first network through the data diode unit to thereby securely communicate decoded contents of the transactional data in one-way communication from temporary storage associated with the second network to the first network for comparison to contents of the transactional data positioned within the first network;
    decoding one or more different barcodes indicative of contents of one or more verification files to thereby define one or more verification barcodes, responsive to receipt of a scan of the display of the first computer by use of the one or more barcode scanning devices, to produce contents of the one or more verification files represented by the one or more verification barcodes, the one or more verification files configured to indicate success of transmission of contents of the transactional data from the first network to the second network; and
    storing decoded contents of the transactional data in more permanent storage associated with the second network responsive to an indication from decoded contents of the one or more verification files of successful transmission of contents of the transactional data from the first network to the second network.

2. A computer-implemented method of claim 1, wherein the method further comprises:
    displaying one or more representations of contents of the transactional data on the display of the first computer when the one or more data barcodes are generated on the display of the first computer,
    transferring decoded contents of the transactional data to the temporary storage associated with the second network after decoding the one or more data barcodes to thereby store decoded contents of the transactional data in one or more validation files, contents of the one or more validation files configured to include decoded contents of the transactional data, displaying one or more representations of contents of the one or more validation files on the display of the second computer after decoding the one or more data barcodes, and displaying one or more representations of contents of the one or more verification files on the display of the first computer when the one or more verification barcodes are generated on the display of the first computer, and wherein each of the one or more representations of contents of the respective transactional data, one or more validation files, and one or more verification files is configured to include one or more of text and numbers.

3. A computer-implemented method of claim 1, wherein the data diode unit includes a first card configured to receive data to thereby define a receive card, the receive card configured to be in communication with the first computer, wherein the data diode unit further includes a second card configured to transmit data to thereby define a send card, the send card configured to be in communication with the second computer, and wherein transmitting decoded contents of the transactional data from the second network to the first network through the data diode unit includes transmitting decoded contents of the transactional data from the send card to the receive card through an optical link.

4. A computer-implemented method of claim 1, wherein the method further comprises generating the one or more data barcodes on the display of the first computer, generating the one or more verification barcodes on the display of the first computer responsive to a comparison of the securely communicated decoded contents of the transactional data and contents of the transactional data positioned in the first network, and discarding decoded contents of the transactional data in the temporary storage associated with the second network responsive to an indication from decoded contents of the one or more verification files of unsuccessful transmission of contents of the transactional data to the second network.

5. A computer-implemented method of claim 4, wherein the one or more data barcodes are configured to encode contents of the transactional data and the one or more verification barcodes are configured to encode contents of the one or more verification files.

6. A computer-implemented method of claim 1, wherein the first network comprises a high-security network and the second network comprises a low-security network.

7. A computer-implemented method of claim 1, wherein the first network comprises a low-security network and the second network comprises a high-security network.

8. A computer-implemented method of claim 1, wherein decoding the one or more data barcodes includes disregarding error-correction capabilities of the one or more data barcodes; wherein the one or more data barcodes and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

9. A system to transfer data between two or more networks configured to have different levels of network protection, the system comprising:

a first computer in communication with and positioned within a first network, the first computer including one or more processors and one or more displays in communication with the one or more processors;

a data diode unit in communication with one or more processors of a second computer and positioned to transmit data from the second computer to the first network; and the second computer positioned remote from the first computer and in communication with and positioned within a second network, the second network configured to have temporary storage and separate more permanent storage associated therewith, the second network further configured to have a different level of network security protection than the first network and to allow only one-way secure communication from the second network to the first network through the data diode unit, the second computer including:

one or more processors, one or more input and output units in communication with the one or more processors of the second computer, one or more barcode scanning devices in communication with the one or more processors of the second computer, and non-transitory memory medium in communication with the one or more processors of the second computer, the memory medium including computer-readable instructions stored therein that when executed cause the second computer to perform the steps of:

decoding one or more barcodes indicative of contents of transactional data associated with and positioned within the first network to thereby define one or more data barcodes, responsive to receipt of a scan of one or more of the one or more displays of the first computer by use of the one or more barcode scanning devices, to produce contents of the transactional data represented by the one or more data barcodes, transmitting decoded contents of the transactional data from the second network to the first network through the data diode unit to thereby securely communicate decoded contents of the transactional data in one-way communication from the temporary storage associated with the second network to the first network for comparison to contents of the transactional data positioned within the first network, decoding one or more different barcodes indicative of contents of one or more verification files to thereby define one or more verification barcodes, responsive to receipt of a scan of one or more of the one or more displays of the first computer by use of the one or more barcode scanning devices, to produce contents of the one or more verification files represented by the one or more verification barcodes, the one or more verification files configured to indicate success of transmission of contents of the transactional data from the first network to the second network, and storing decoded contents of the transactional data in the more permanent storage associated with the second network, responsive to an indication from decoded contents of the one or more verification files of successful transmission of contents of the transactional data from the first network to the second network.

10. A system of claim 9, wherein one or more representations of contents of the transactional data are displayed on one or more of the one or more displays of the first computer when the one or more data barcodes are displayed on one or more of the one or more displays of the first computer, wherein one or more representations of contents of the one or more verification files are displayed on one or more of the one or more displays of the first computer when the one or more verification barcodes are displayed on one or more of the one or more displays of the first computer, wherein the memory medium further includes computer-readable instructions stored therein that when executed cause the second computer to perform the steps of, after decoding the one or more data barcodes, transferring decoded contents of the transactional data to the temporary storage associated with the second network to thereby store decoded contents of the transactional data in one or more validation files and further displaying one or more representations of contents of the one or more validation files on one or more of the one or more displays of the second computer, contents of the one or more validation files configured to include decoded contents of the transactional data, and wherein each of the one or more representations of contents of the respective transactional data, one or more validation files, and one or more verification files is configured to include one or more of text and numbers.

11. A system of claim 9, wherein the one or more barcode scanning devices are positioned to enable scanning of the one or more displays of the first computer, wherein the data diode unit includes a first card configured to receive data to thereby define a receive card, the receive card configured to be in communication with the one or more processors of the first computer, wherein the data diode unit further includes a second card configured to transmit data to thereby define a send card, the send card configured to be in communication with the one or more processors of the second computer, and wherein transmitting decoded contents of the transactional data from the second network to the first network through the data diode unit includes transmitting decoded contents of the transactional data from the send card to the receive card through an optical link.

12. A system of claim 9, wherein the memory medium further includes computer-readable instructions stored therein that when executed cause the second computer to perform the step of discarding decoded contents of the transactional data in the temporary storage associated with the second network, responsive to an indication from decoded contents of the one or more verification files of unsuccessful transmission of contents of the transactional data to the second network, and wherein the first computer further includes one or more input and output units in communication with the one or more processors of the first computer and non-transitory memory medium in communication with the one or more processors of the first computer, the memory medium of the first computer including computer-readable instructions stored therein that when executed cause the first computer to perform the steps of:
  generating the one or more data barcodes on one or more of the one or more displays of the first computer, and
  generating, responsive to a comparison of contents of the transactional data and the securely communicated decoded contents of the transactional data, the one or more verification barcodes on one or more of the one or more displays of the first computer.

13. A system of claim 12, wherein the one or more data barcodes are configured to encode contents of the transactional data, and wherein the one or more verification barcodes are configured to encode contents of the one or more verification files.

14. A system of claim 9, wherein the first network comprises a high-security network and the second network comprises a low-security network.

15. A system of claim 9, wherein the first network comprises a low-security network and the second network comprises a high-security network.

16. A system of claim 9, wherein decoding the one or more data barcodes includes disregarding error-correction capabilities of the one or more data barcodes; wherein the one or more data barcodes and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

17. Non-transitory computer-readable medium having one or more computer programs stored therein operable by one or more processors to transfer data between two or more networks configured to have different levels of network protection, the one or more computer programs comprising a set of instructions that, when executed by the one or more processors, cause the one or more processors to perform the operations of:
  decoding one or more barcodes indicative of contents of transactional data associated with and positioned within a first network to thereby define one or more data barcodes, responsive to receipt of a scan of a display of a first computer in communication with and positioned within the first network, by use of one or more barcode scanning devices in communication with a second computer positioned remote from the first computer and in communication with and positioned within a second network, to produce contents of the transactional data represented by the one or more data barcodes, the second network configured to have a different level of network security protection than the first network and configured to allow only one-way secure communication from the second network to the first network by use of a data diode unit;
  transmitting decoded contents of the transactional data from the second network to the first network through the data diode unit to thereby securely communicate decoded contents of the transactional data in one-way communication from temporary storage associated with the second network to the first network for comparison to contents of the transactional data positioned within the first network;
  decoding one or more different barcodes indicative of contents of one or more verification files to thereby define one or more verification barcodes, responsive to receipt of a scan of the display of the first computer by use of the one or more barcode scanning devices, to produce contents of the one or more verification files represented by the one or more verification barcodes, the one or more verification files configured to indicate success of transmission of contents of the transactional data from the first network to the second network; and
  storing decoded contents of the transactional data in more permanent storage associated with the second network responsive to an indication from decoded contents of the one or more verification files of successful transmission of contents of the transactional data from the first network to the second network.

18. Non-transitory computer-readable medium having one or more computer programs stored therein of claim 17, wherein the set of instructions, when executed by the one or more processors, further cause the one or more processors to perform the operations of:
  displaying one or more representations of contents of the transactional data on the display of the first computer when the one or more data barcodes are generated on the display of the first computer, transferring decoded contents of the transactional data to the temporary storage associated with the second network after decoding the one or more data barcodes to thereby store decoded contents of the transactional data in one or more validation files, contents of the one or more validation files configured to include decoded contents of the transactional data, displaying one or more representations of contents of the one or more validation files on the display of the second computer after decoding the one or more data barcodes, and displaying one or more representations of contents of the one or more verification files on the display of the first computer when the one or more verification barcodes are generated on the display of the first computer, and wherein each of the one or more representations of contents of the respective transactional data, one or more validation files, and one or more verification files is configured to include one or more of text and numbers.

19. Non-transitory computer-readable medium having one or more computer programs stored therein of claim 17, wherein the data diode unit includes a first card configured to receive data to thereby define a receive card, the receive card configured to be in communication with the first computer, wherein the data diode unit further includes a second card configured to transmit data to thereby define a send card, the send card configured to be in communication with the second computer, and wherein transmitting decoded contents of the transactional data from the second network to the first network through the data diode unit includes transmitting decoded contents of the transactional data from the send card to the receive card through an optical link.

20. Non-transitory computer-readable medium having one or more computer programs stored therein of claim 17, wherein the set of instructions, when executed by the one or more processors, further cause the one or more processors to perform the operations of:

generating the one or more data barcodes on the display of the first computer;

generating the one or more verification barcodes on the display of the first computer, responsive to a comparison of the securely communicated decoded contents of the transactional data and contents of the transactional data; and discarding decoded contents of the transactional data, responsive to an indication from decoded contents of the one or more verification files of unsuccessful transmission of contents of the transactional data to the second network.

21. Non-transitory computer-readable medium having one or more computer programs stored therein of claim 20, wherein the one or more data barcodes are configured to encode contents of the transactional data, and wherein the one or more verification barcodes are configured to encode contents of the one or more verification files.

22. Non-transitory computer-readable medium having one or more computer programs stored therein of claim 17, wherein the first network comprises a high-security network and the second network comprises a low-security network.

23. Non-transitory computer-readable medium having one or more computer programs stored therein of claim 17, wherein the first network comprises a low-security network and the second network comprises a high-security network.

24. Non-transitory computer-readable medium having one or more computer programs stored therein of claim 17, wherein decoding one or more data barcodes includes disregarding error-correction capabilities of the one or more data barcodes; wherein the one or more data barcodes and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

\* \* \* \* \*